(12) United States Patent
Kida et al.

(10) Patent No.: US 10,691,041 B2
(45) Date of Patent: Jun. 23, 2020

(54) EXPOSURE DEVICE, READING HEAD, IMAGE FORMATION APPARATUS, AND IMAGE READING APPARATUS

(71) Applicant: Oki Data Corporation, Tokyo (JP)

(72) Inventors: Manabu Kida, Tokyo (JP); Tomoki Igari, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 16/384,922

(22) Filed: Apr. 16, 2019

(65) Prior Publication Data

US 2019/0361368 A1 Nov. 28, 2019

(30) Foreign Application Priority Data

May 25, 2018 (JP) .................................. 2018-100630

(51) Int. Cl.
*G03G 15/04* (2006.01)
*G02B 3/00* (2006.01)
*G02B 7/02* (2006.01)

(52) U.S. Cl.
CPC ..... *G03G 15/04036* (2013.01); *G02B 3/0037* (2013.01); *G02B 3/0075* (2013.01); *G02B 7/021* (2013.01); *G03G 2215/0402* (2013.01); *G03G 2215/0407* (2013.01); *G03G 2215/0409* (2013.01)

(58) Field of Classification Search
CPC ... G03G 2215/0402; G03G 2215/0407; G03G 2215/0409; G03G 15/04036; G02B 3/0037; G02B 3/0075; G02B 7/021
See application file for complete search history.

(56) References Cited

U.S. PATENT DOCUMENTS

| | | | |
|---|---|---|---|
| 2003/0021034 A1* | 1/2003 | Yoshikawa | G02B 3/0031 359/619 |
| 2008/0030566 A1* | 2/2008 | Nomura | B41J 2/45 347/130 |
| 2010/0254723 A1* | 10/2010 | Tanaka | B41J 2/451 399/51 |
| 2017/0315426 A1* | 11/2017 | Ida | G02B 7/02 |
| 2018/0031741 A1* | 2/2018 | Suzuki | G02B 7/028 |
| 2018/0091691 A1* | 3/2018 | Kida | H04N 1/02865 |
| 2019/0196356 A1* | 6/2019 | Nakamichi | G02B 3/0068 |

FOREIGN PATENT DOCUMENTS

| | | | |
|---|---|---|---|
| JP | 2013-15847 A | | 1/2013 |
| JP | 2017132120 A | * | 8/2017 |

* cited by examiner

*Primary Examiner* — Ryan D Walsh
(74) *Attorney, Agent, or Firm* — Metrolex IP Law Group, PLLC

(57) ABSTRACT

An exposure device according to an embodiment may include: a holding member provided with a reference surface; an optical system being in contact with the reference surface and slidable in a first direction parallel to the reference surface; and a board including a light emitting element and being fixed to the holding member such that the optical system is sandwiched between the reference surface and the board.

19 Claims, 21 Drawing Sheets

EXPOSURE DEVICE, READING HEAD, IMAGE FORMATION APPARATUS, AND IMAGE READING APPARATUS

CROSS REFERENCE TO RELATED APPLICATIONS

This application claims priority based on 35 USC 119 from prior Japanese Patent Application No. JP2018-100630 filed on May 25, 2018, entitled "EXPOSURE DEVICE, READING HEAD, IMAGE FORMATION APPARATUS, AND IMAGE READING APPARATUS", the entire contents of which are incorporated herein by reference.

BACKGROUND

This disclosure is related to an exposure device, a reading head, an image formation apparatus, and an image reading apparatus.

An exposure device used as a printing head of an image formation apparatus includes: an optical system formed by stacking a lens array including lens elements arranged in one direction on a light shielding plate including openings arranged in the same direction; and a holding member to hold the optical system.

Such related art is disclosed in Japanese Patent Application Publication No. 2013-15847 (see FIG. 1).

SUMMARY

However, the linear expansion coefficient of the lens array is different from that of the holding member. Therefore, the optical system (the stacked body) may cause warpage due to a change in temperature.

An object of an embodiment is to suppress warpage of an optical system due to a change in temperature.

A first aspect of one or more embodiments in this disclosure is an exposure device that may include: a holding member provided with a reference surface; an optical system being in contact with the reference surface and slidable in a first direction parallel to the reference surface; and a board including a light emitting element and being fixed to the holding member such that the optical system is sandwiched between the reference surface and the board.

A second aspect of one or more embodiments in this disclosure is an image formation apparatus that may include: the exposure device according to the first aspect; an image carrier disposed opposite to the exposure device; a development unit configured to develop an image formed on the image carrier by the exposure device; and a transfer unit configured to transfer the image developed by the development unit onto a recording medium.

A third aspect of one or more embodiments in this disclosure is a reading head that may include: a holding member provided with a reference surface; an optical system being in contact with the reference surface and slidable in a first direction parallel to the reference surface; and a board including a light receiving element and being fixed to the holding member such that the optical system is sandwiched between the reference surface and the board.

A fourth aspect of one or more embodiments in this disclosure is an image reading apparatus that may include: the reading head according to the third aspect; and a platen configured to hold a subject copy at a position opposed to the reading head.

According to at least one of the aspects, the optical system is slidable with respect to the holding member. Thus, it may be possible to suppress warpage of the optical system even when there is a difference in linear expansion coefficient.

DETAILED DESCRIPTION

Figure 1:
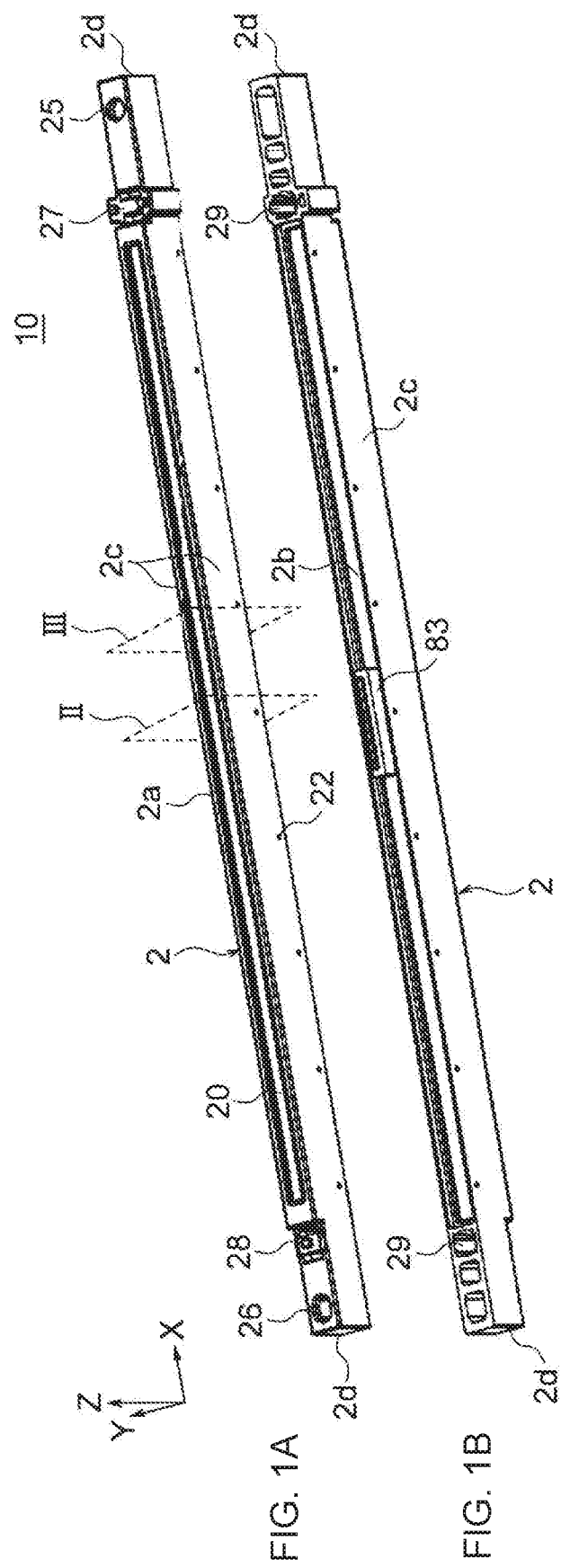
FIG. 1A is a diagram illustrating a perspective view of an exposure device according one or more embodiments viewed from a photoconductor drum side and FIG. 1B is a diagram illustrating a perspective view of the exposure device viewed from an opposite side of FIG. 1A.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

<Configuration of Exposure Device>

Figure 2:
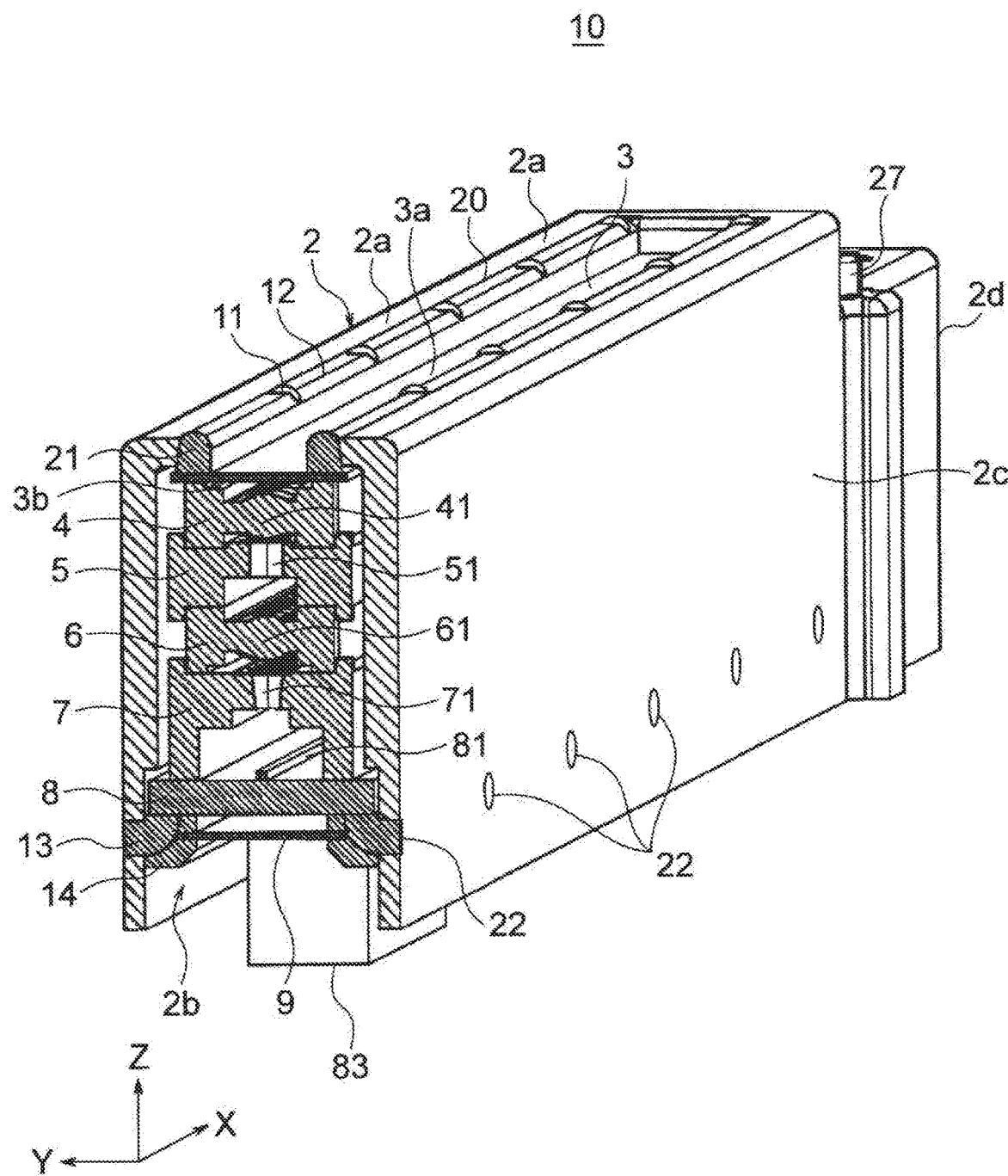
FIG. 2 is a diagram illustrating a partially sectioned perspective view of a cross-section along plane II in FIG. 1A.
Figure 3:
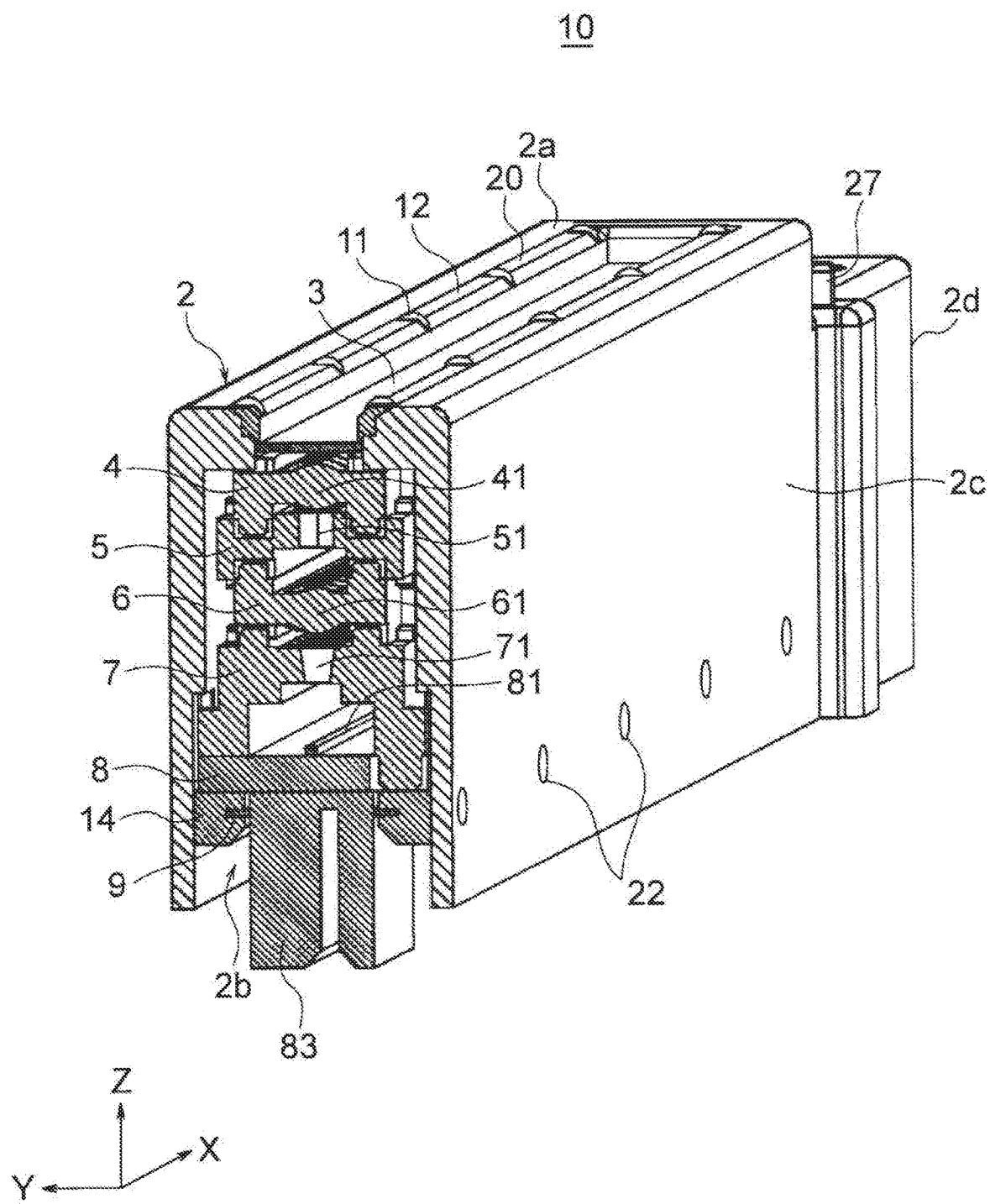
FIG. 3 is a diagram illustrating a partially sectioned perspective view of a cross-section along plane III in FIG. 1A.

First, a configuration of an exposure device 10 of one or more embodiments is described. FIG. 1A is a diagram illustrating a perspective view of the exposure device 10 viewed from a photoconductor drum 31 (FIG. 19) side being an exposure object. FIG. 1B is a perspective view of the exposure device 10 viewed from the opposite side of FIG. 1A. FIG. 2 is a diagram illustrating a partially sectioned perspective view illustrating a cross-section II in FIG. 1A. FIG. 3 is a diagram illustrating a partially sectioned perspective view illustrating a cross-section along plane III in FIG. 1A.

Figure 19:
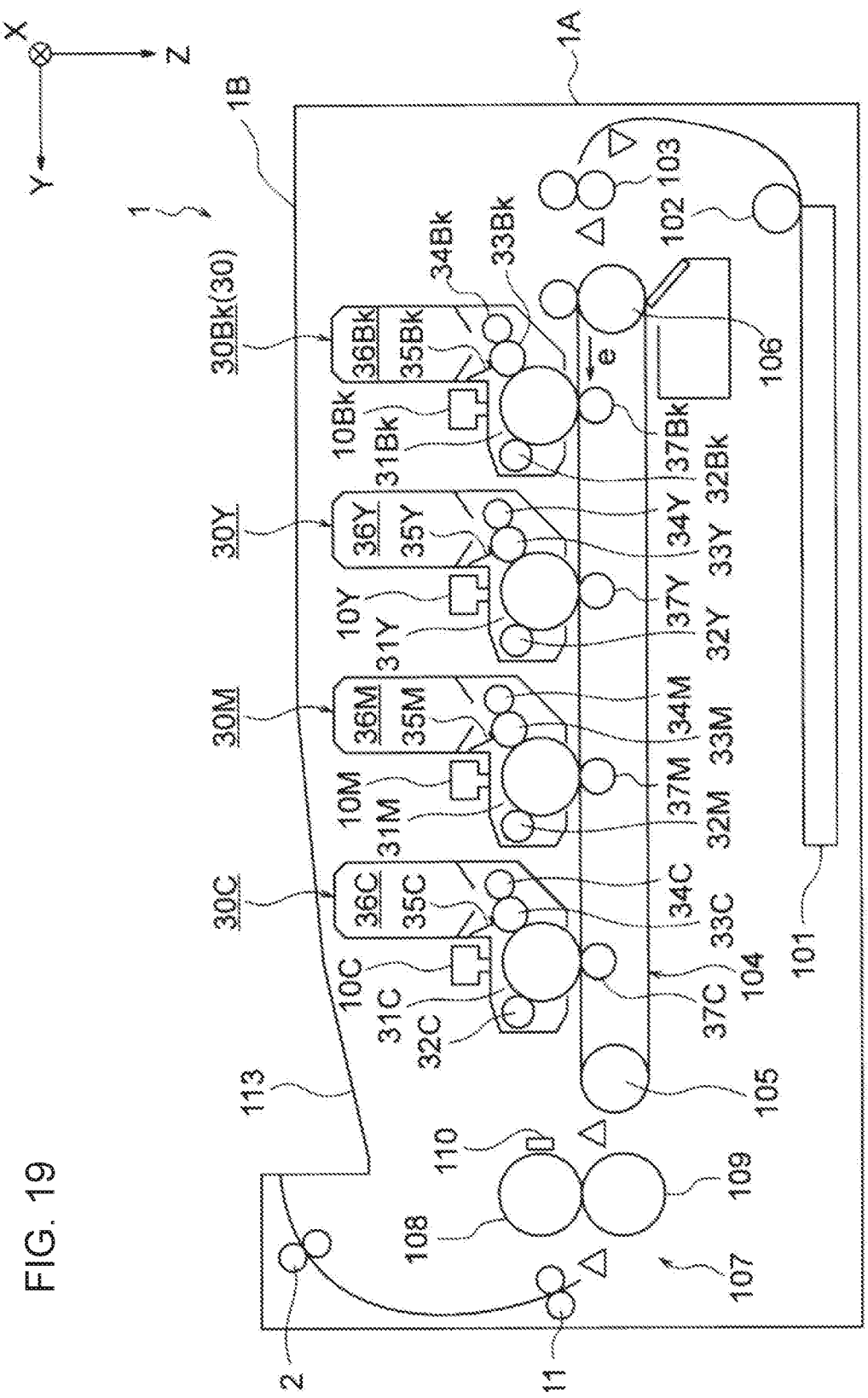
FIG. 19 is a diagram illustrating a view of an image formation apparatus including the exposure device according to one or more embodiments.

The exposure device 10 is used as a printing head (an optical head) in an image formation apparatus 1 (FIG. 19) such as a printer. The exposure device 10 has an elongated shape which is long in one direction. The length of the exposure device 10 is determined by specifications of the image formation apparatus 1 (FIG. 19). Here, a description is given of the exposure device 10 used in the image formation apparatus 1 mainly adaptable to recording media in A4 size. However, the embodiment is not limited only to this configuration.

In the following, the longitudinal direction of the exposure device 10 is defined as an x direction. An output direction of light from the exposure device 10, or in other words, a direction of a lens optical axis of lens arrays 4 and 6 (FIG. 2) to be described later is defined as a z direction. A direction orthogonal to the x direction and the z direction, namely, a width direction of the exposure device 10 is defined as a y direction. Meanwhile, for the convenience of explanation, a direction of advance of the output light from the exposure device 10 (upward in FIG. 1A) is defined as a +z direction (upward) and an opposite direction thereto (downward in FIG. 1A) is defined as a −z direction (downward). It is to be noted, however, that the upward and downward directions are inverted in a state where the exposure device 10 is installed into the image formation apparatus 1 (FIG. 19).

As illustrated in FIG. 2, the exposure device 10 includes a cover 3, a first lens array 4, an intermediate light shielding plate 5 serving as a first light shielding member, a second lens array 6, an incident side light shielding plate 7 serving as a second light shielding member, a board 8, and a holder 2 to hold these constituents.

The cover 3, the first lens array 4, the intermediate light shielding plate 5, the second lens array 6, the incident side light shielding plate 7, and the board 8 each have an elongated shape that is long in the x direction, and are stacked on one another in the z direction. The cover 3 is located uppermost (the +z direction) and the board 8 is located lowermost (the −z direction). The holder 2 is a housing that surrounds this stacked body.

The cover 3 is fixed (bonded) to the holder 2 with an adhesive 11. Meanwhile, the board 8 is fixed (bonded) to the holder 2 with an adhesive 13. The first lens array 4, the intermediate light shielding plate 5, the second lens array 6, and the incident side light shielding plate 7 are held in a state of being sandwiched in the z direction between the cover 3 and the board 8.

An insulating film 9 is provided further below (the −z direction) the board 8. The insulating film 9 is fixed (bonded) to the holder 2 with a sealing resin 14. The periphery of the cover 3 is sealed with a sealing resin 12 and the periphery of the insulating film 9 is sealed with the sealing resin 14. These constituents of the exposure device 10 are described one by one below.

<Configuration of Holder 2>

Figure 4:
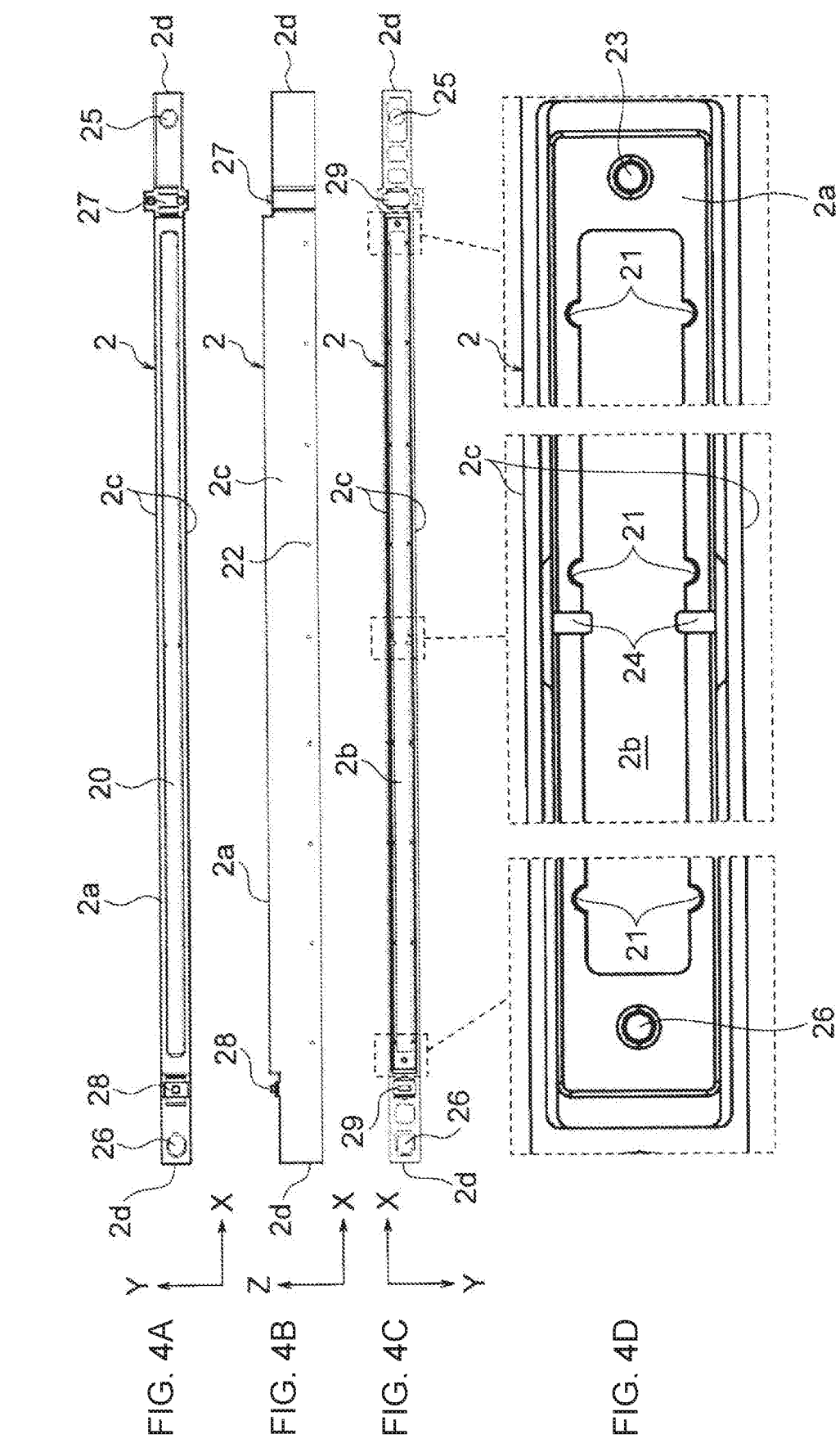
FIG. 4A is a diagram illustrating a top view.
FIG. 4B is a diagram illustrating a side view.
FIG. 4C is a diagram illustrating a bottom view.
FIG. 4D is a diagram illustrating an enlarged bottom view of a holder for the exposure device.

First, a configuration of the holder 2 is described. FIGS. 4A, 4B, and 4C are diagrams illustrating a top view, a side view, and a bottom view of the holder 2, respectively. Here, the top view is a diagram viewed from the +z side and the bottom view is a diagram viewed from the −z side. FIG. 4D is an enlarged diagram illustrating an end portion in the −x direction, a central portion in the x direction, and an end portion in the +x direction of the holder 2 which are illustrated in FIG. 4C, respectively.

The holder 2 is made of a resin such as a liquid crystal polymer. Here, when the holder 2 is made of the liquid crystal polymer, its linear expansion coefficient is $8 \times 10^{-6}$/K.

As illustrated in FIGS. 4A and 4B, the holder 2 includes an upper surface part 2a located at an end portion in the +z direction, two side walls 2c located at two ends in the y direction, and two end surface parts 2d located at two ends in the x direction. An end portion in the −z direction of the holder 2 is rendered to open so as to constitute an open end 2b.

As illustrated in FIG. 4A, an opening 20 is formed in the upper surface part 2a of the holder 2. The opening 20 is a portion to allow passage of light that is transmitted through the lens arrays 4 and 6.

A substantially circular hole 25 is formed in an end portion in the +x direction of the upper surface part 2a while an elongated hole 26 which is long in the x direction is formed in an end portion in the −x direction of the upper surface part 2a. The hole 25 and the elongated hole 26 are portions to engage with projections provided on the image formation apparatus 1 (FIG. 19) so as to establish positioning of the holder 2 in the x-y plane.

Meanwhile, contact parts 27 and 28 are formed at portion of the upper surface part 2a located on the inside in the x direction of the hole 25 and of the elongated hole 26. The contact parts 27 and 28 are portions that come into contact in the z direction with contact parts that are provided to the image formation apparatus 1 (FIG. 19) so as to establish positioning of the holder 2 in the z direction.

As illustrated in FIG. 4B, hole portions 22 are formed in each side wall 2c of the holder 2 at regular intervals in the x direction. The hole portions 22 are portions that are used to supply the adhesive 13 (FIG. 2) for fixing the board 8 to the holder 2 to boding positions adjacent to both the board 8 and the holder 2. It is to be noted that FIG. 2 described above is a sectional view of the exposure device 10 taken along a cross-section II that penetrates a pair of the hole portions 22, and FIG. 3 is a cross-sectional view thereof taken along a cross-section III that does not penetrate any hole portions 22.

As illustrated in FIG. 4D, cutouts 21 are formed in an inner edge part of the opening 20 of the upper surface part 2a. The cutouts 21 (see FIG. 11) are formed in two end edges in the y direction of the opening 20 at regular intervals in the x direction. The cutouts 21 are portions that are used to supply the adhesive 11 (FIG. 2) for fixing (bonding) the cover 3 to the holder 2.

Two pins 23 projecting downward (the −z direction) are formed on the upper surface part 2a of the holder 2. The pins 23 each have a columnar shape, for instance, and are formed on two sides in the x direction of the opening 20, respectively. The pins 23 are portions to engage with grooves 42 (to be described later) of the first lens array 4.

Meanwhile, two protrusions 24 (see FIG. 11) projecting downward (the −z direction) are formed at the center in the x direction of the upper surface part 2a. The protrusions 24 are formed on two sides in the y direction of the opening 20, respectively. The protrusions 24 are portions to engage with recesses 44 (to be described later) of the first lens array 4.

In the meantime, as illustrated in FIG. 4C, engaging parts 29 to engage with pressing members (coil springs) of the image formation apparatus 1 are formed at two ends in the x direction of the open end 2b of the holder 2, respectively. The holder 2 is pressed in the +z direction by the pressing members. Thus, the above-mentioned contact parts 27 and 28 (FIG. 4A) come into contact with the contact parts of the image formation apparatus 1 and the positioning in the z direction of the holder 2 is established.

<Configuration of Cover 3>

Next, a configuration of the cover 3 is described. The cover 3 illustrated in FIG. 2 is a rectangular film that transmits the light and includes a front surface 3a and a rear surface 3b. Both of the front surface 3a and the rear surface 3b are surfaces parallel to the x-y plane. The rear surface 3b of the cover 3 serves as a position reference in the z direction of each constituent to be described later, and is therefore explained as the reference surface 3b in the following.

The area of the cover 3 is larger than the area of the opening 20 of the holder 2 and smaller than the area of the inside of the holder 2. The cover 3 is fixed in such a way as to close the opening 20 by using the adhesive 11 provided to the cutouts 21 in the holder 2.

The cover 3 is made of polyethylene terephthalate (PET), for example. When the cover 3 is made of PET, its linear expansion coefficient is $15 \times 10^{-6}$/K. Here, the cover 3 does not always have to be the film but may be any of a sheet and a plate.

Cutouts 3c (FIG. 11) are formed in two ends in the y direction of the cover 3 each at the center in the x direction. The cutouts 3c are provided in order to avoid interference with the protrusions 24 of the holder 2.

<Configuration of First Lens Array 4>

Figure 5:
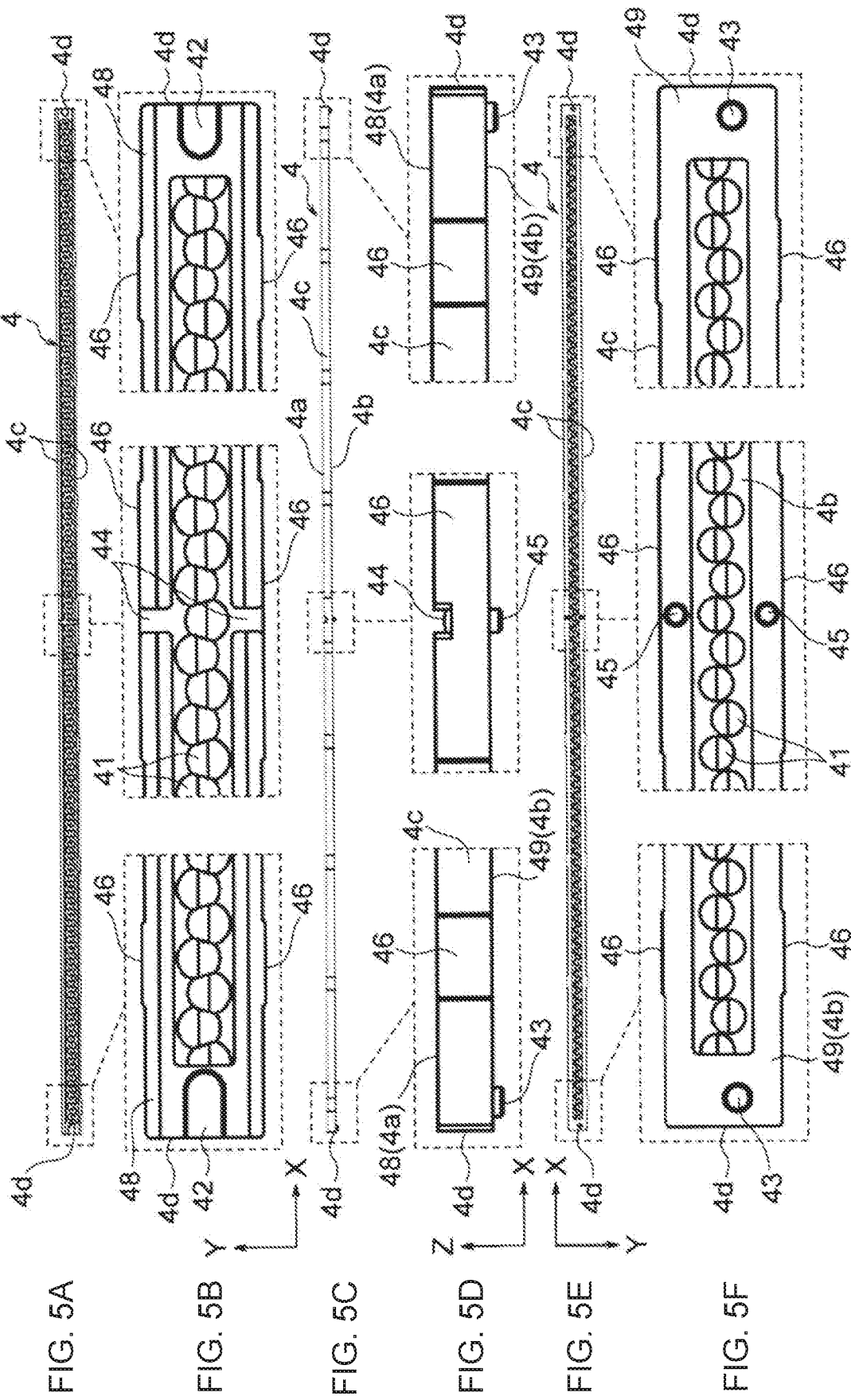
FIG. 5A is a diagram illustrating a top view.
FIG. 5B is a diagram illustrating an enlarged top view.
FIG. 5C is a diagram illustrating a side view.
FIG. 5D is a diagram illustrating an enlarged side view.
FIG. 5E is a diagram illustrating a bottom view.
FIG. 5F is a diagram illustrating an enlarged bottom view of a first lens array of the exposure device.

Next, a configuration of the first lens array 4 is described. FIG. 5A is a diagram illustrating a top view of the first lens array 4 and FIG. 5B is a diagram illustrating an enlarged view illustrating an end portion in the −x direction, a central portion in the x direction, and an end portion in the +x direction of the first lens array 4 which are illustrated in FIG. 5A, respectively. FIG. 5C is a diagram illustrating a side view of the first lens array 4 and FIG. 5D is a diagram illustrating an enlarged view illustrating the end portion in the −x direction, the central portion in the x direction, and the end portion in the +x direction of the first lens array 4 which are illustrated in FIG. 5C, respectively. FIG. 5E is a diagram illustrating a bottom view of the first lens array 4 and FIG. 5F is a diagram illustrating an enlarged view illustrating the end portion in the −x direction, the central portion in the x direction, and the end portion in the +x direction of the first lens array 4 which are illustrated in FIG. 5E, respectively.

The first lens array 4 is made of a resin such as a cycloolefin polymer. The cycloolefin polymer has an advantage of low water absorption percentage. Meanwhile, any of acrylic resin, polycarbonate, and epoxy resin may be used instead. When the first lens array 4 is made of the cycloolefin polymer, its linear expansion coefficient is $60 \times 10^{-6}$/K.

As illustrated in FIGS. 5A and 5C, the first lens array 4 includes an upper surface part 4a located at an end portion in the +z direction, a lower surface part 4b located at an end portion in the −z direction, two side wall parts 4c located at two ends in the y direction, and two end surface parts 4d located at two ends in the x direction.

As illustrated in FIG. 5B, the first lens array 4 includes lens elements (microlenses) 41 arranged in the x direction. A direction of an optical axis of each lens element 41 coincides with the z direction. Here, the lens elements 41 are arranged in two rows in a staggered manner, where each row has a constant pitch P in the x direction. The lens elements 41 are formed in a central region in the x direction and the y direction of the first lens array 4.

A contact surface 48 having a high degree of flatness of 10 μm or below, for example, is formed along two ends in the y direction of the upper surface part 4a. The contact surface 48 is a surface that is parallel to the x-y plane and designed to come into contact with the reference surface 3b (FIG. 2) of the cover 3.

The grooves 42 are formed in two ends in the x direction of the upper surface part 4a, respectively. Each groove 42 has an elongated shape that is long in the x direction. The grooves 42 are portions to engage with the pins 23 (FIG. 4D) of the holder 2 mentioned above.

As illustrated in FIGS. 5B and 5D, the recesses 44 are formed at the center in the x direction of the upper surface part 4a. Here, the two recesses 44 are formed at two ends in the y direction of the upper surface part 4a. The recesses 44 are portions to engage with the protrusions 24 (FIG. 4D) of the holder 2 mentioned above.

As illustrated in FIG. 5F, a contact surface 49 having a high degree of flatness of 10 μm or below, for example, is formed on the lower surface part 4b in such a way as to surround a region to dispose the lens elements 41 (that is, a central region). The contact surface 49 is a surface that is parallel to the x-y plane and designed to come into contact with a contact surface 58 (to be described later) of the intermediate light shielding plate 5.

As illustrated in FIGS. 5D and 5F, pins 43 projecting in the −z direction are formed at two ends in the x direction of the lower surface part 4b, respectively. The pins 43 are portions to engage with grooves 52 (to be described later) of the intermediate light shielding plate 5.

Protrusions 45 projecting in the −z direction are formed at the center in the x direction of the lower surface part 4b. Here, the two protrusions 45 are formed on two ends in the y direction of the lower surface part 4b, respectively. The protrusions 45 are portions to engage with recesses 54 (to be described later) of the intermediate light shielding plate 5.

Wall surface portions 46 projecting outward in the y direction are formed at regular intervals in the x direction on the two side wall parts 4c, respectively. The wall surface portions 46 are surfaces that are parallel to the x-y plane and designed to come into contact with projections 56 (to be described later) of the intermediate light shielding plate 5.

<Configuration of Intermediate Light Shielding Plate 5>

Figure 6:
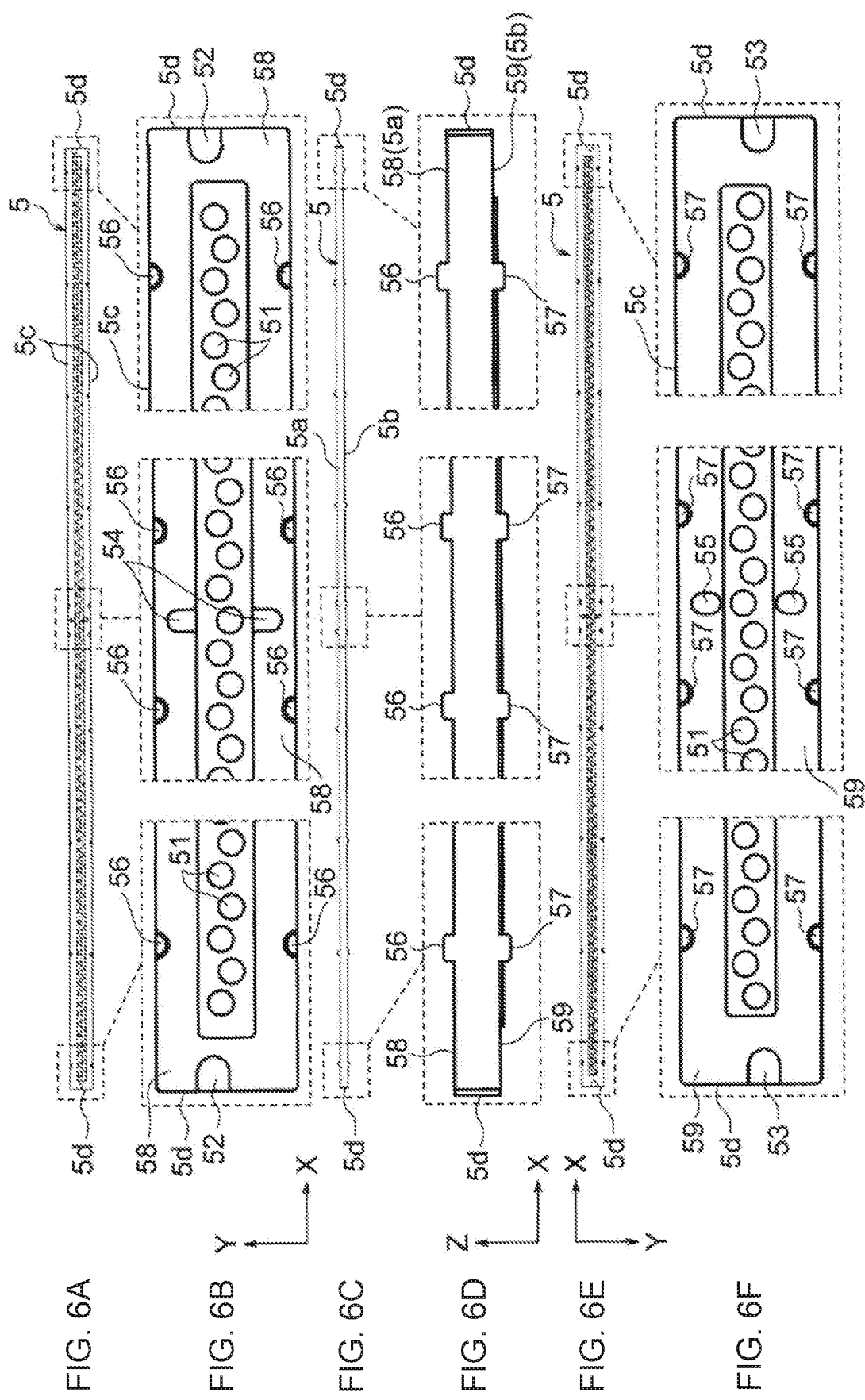
FIG. 6A is a diagram illustrating a top view.
FIG. 6B is a diagram illustrating an enlarged top view.
FIG. 6C is a diagram illustrating a side view.
FIG. 6D is a diagram illustrating an enlarged side view.
FIG. 6E is a diagram illustrating a bottom view.
FIG. 6F is a diagram illustrating an enlarged bottom view of an intermediate light shielding plate of the exposure device.

Next, a configuration of the intermediate light shielding plate 5 is described. FIG. 6A is a diagram illustrating a top view of the intermediate light shielding plate 5 and FIG. 6B is a diagram illustrating an enlarged view illustrating an end portion in the −x direction, a central portion in the x direction, and an end portion in the +x direction of the intermediate light shielding plate 5 which are illustrated in FIG. 6A, respectively. FIG. 6C is a diagram illustrating a side view of the intermediate light shielding plate 5 and FIG. 6D is a diagram illustrating an enlarged view illustrating the end portion in the −x direction, the central portion in the x direction, and the end portion in the +x direction of the intermediate light shielding plate 5 which are illustrated in FIG. 6C, respectively. FIG. 6E is a diagram illustrating a bottom view of the intermediate light shielding plate 5 and FIG. 6F is a diagram illustrating an enlarged view illustrating the end portion in the −x direction, the central portion in the x direction, and the end portion in the +x direction of the intermediate light shielding plate 5 which are illustrated in FIG. 6E, respectively.

The intermediate light shielding plate 5 is made of a resin such as polycarbonate. Instead, acrylonitrile butadiene styrene (ABS) resin may be used. Here, when the intermediate light shielding plate 5 is made of polycarbonate, its linear expansion coefficient is $70 \times 10^{-6}$/K.

The intermediate light shielding plate 5 has functions to secure an optimum distance between the first lens array 4 and the second lens array 6, and to shut off stray light originating from light beams incident from the second lens array 6 into the first lens array 4.

As illustrated in FIGS. 6A and 6C, the intermediate light shielding plate 5 includes an upper surface part 5a located at an end portion in the +z direction, a lower surface part 5b located at an end portion in the −z direction, two side wall parts 5c located at two ends in the y direction, and two end surface parts 5d located at two ends in the x direction. In the meantime, a width (that is, a dimension in the y direction) of the intermediate light shielding plate 5 is larger than the width of the first lens array 4 and the width of the second lens array 6.

As illustrated in FIG. 6B, the intermediate light shielding plate 5 includes openings 51 arranged in the x direction. A position of each opening 51 corresponds to a position of the counterpart lens element 41 (FIGS. 5B and 5F). Each opening 51 has a cylindrical shape having the center aligned with the axis in the z direction. The openings 51 are formed in a central region in the x direction and the y direction of the intermediate light shielding plate 5.

The contact surface 58 having a high degree of flatness of 10 μm or below, for example, is formed on the upper surface part 5a in such a way as to surround a region to dispose the openings 51 (that is, the central region). The contact surface 58 is a surface that is parallel to the x-y plane and designed to come into contact with the contact surface 49 (FIG. 5F) of the first lens array 4.

The grooves 52 are formed in two ends in the x direction of the upper surface part 5a, respectively. Each groove 52 has an elongated shape that is long in the x direction. The grooves 52 are portions to engage with the pins 43 (FIG. 5F) of the first lens array 4.

The recesses 54 are formed at the center in the x direction of the upper surface part 5a. Here, the two recesses 54 are formed at two ends in the y direction of the region to dispose the openings 51 (the central region). The recesses 54 are portions to engage with the protrusions 45 (FIG. 5F) of the first lens array 4.

As illustrated in FIGS. 6B and 6D, the projections 56 projecting in the +z direction are formed at two ends in the y direction and arranged in the x direction of the upper surface part 5a. Here, each projection 56 has a semi-cylindrical shape with its curved surface oriented inward in the y direction. An interval between two of the projections 56 opposed to each other in the y direction is slightly larger than the width of the first lens array 4. The projections 56 are guide portions that come into contact with the wall surface portions 46 (FIG. 5F) of the first lens array 4 from outside in the y direction.

As illustrated in FIG. 6F, a contact surface 59 having a high degree of flatness of 10 μm or below, for example, is formed on the lower surface part 5b in such a way as to surround the region to dispose the openings 51 (that is, the central region). The contact surface 59 is a surface that is parallel to the x-y plane and designed to come into contact with a contact surface 69 (to be described later) of the second lens array 6.

Grooves 53 are formed in two ends in the x direction of the lower surface part 5b, respectively. The grooves 53 are portions to engage with pins 63 (to be described later) of the second lens array 6.

Recesses 55 are formed at the center in the x direction of the lower surface part 5b. Here, the two recesses 55 are formed at two ends in the y direction of the region to dispose the openings 51 (the central region). The recesses 55 are portions to engage with protrusions 65 (to be described later) of the second lens array 6.

As illustrated in FIGS. 6D and 6F, projections 57 projecting in the −z direction are formed at two ends in the y direction and arranged in the x direction of the lower surface part 5b. Here, each projection 57 has a semi-cylindrical shape with its curved surface oriented inward in the y direction. An interval between the two of the projections 57 opposed to each other in the y direction is slightly larger than the width of the second lens array 6. The projections 57 are guide portions that come into contact with wall surface portions 66 of the second lens array 6 from outside in the y direction.

<Configuration of Second Lens Array 6>

Figure 7:
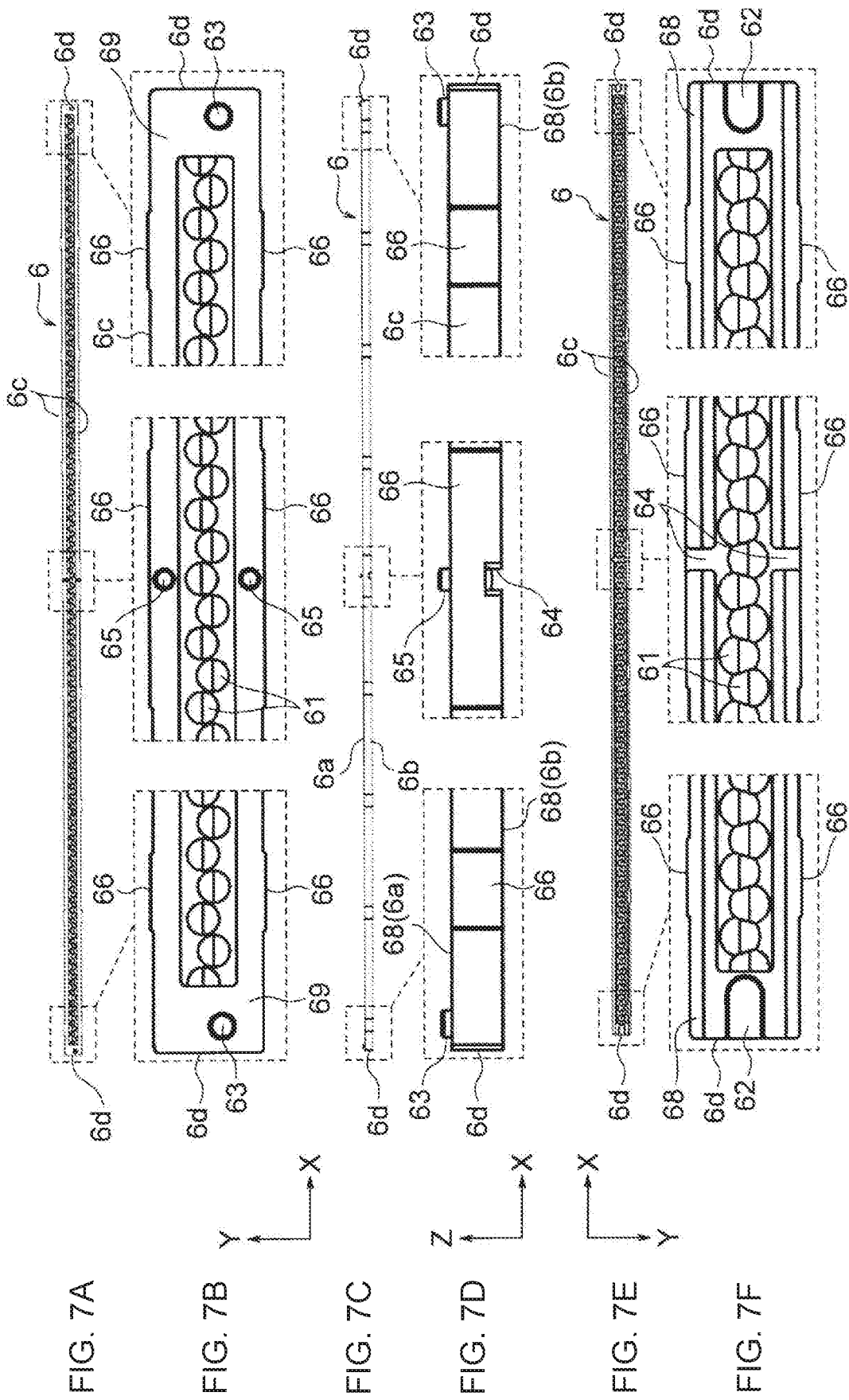
FIG. 7A is a diagram illustrating a top view.
FIG. 7B is a diagram illustrating an enlarged top view.
FIG. 7C is a diagram illustrating a side view.
FIG. 7D is a diagram illustrating an enlarged side view.
FIG. 7E is a diagram illustrating a bottom view.
FIG. 7F is a diagram illustrating an enlarged bottom view of a second lens array of the exposure device.

Next, a configuration of the second lens array 6 is described. FIG. 7A is a diagram illustrating a top view of the second lens array 6 and FIG. 7B is a diagram illustrating an enlarged view illustrating an end portion in the −x direction, a central portion in the x direction, and an end portion in the +x direction of the second lens array 6 which are illustrated in FIG. 7A, respectively. FIG. 7C is a diagram illustrating a side view of the second lens array 6 and FIG. 7D is a diagram illustrating an enlarged view illustrating the end portion in the −x direction, the central portion in the x direction, and the end portion in the +x direction of the second lens array 6 which are illustrated in FIG. 7C, respectively. FIG. 7E is a diagram illustrating a bottom view of the second lens array 6 and FIG. 7F is a diagram illustrating an enlarged view illustrating the end portion in the −x direction, the central portion in the x direction, and the end portion in the +x direction of the second lens array 6 which are illustrated in FIG. 7E, respectively.

The second lens array 6 is made of a resin such as a cycloolefin polymer. Meanwhile, any of acrylic resin, polycarbonate, and epoxy resin may be used instead. When the second lens array 6 is made of the cycloolefin polymer, its linear expansion coefficient is $60 \times 10^{-6}$/K.

As illustrated in FIGS. 7A and 7C, the second lens array 6 includes an upper surface part 6a located at an end portion in the +z direction, a lower surface part 6b located at an end portion in the −z direction, two side wall parts 6c located at two ends in the y direction, and two end surface parts 6d located at two ends in the x direction.

As illustrated in FIG. 7B, the second lens array 6 includes lens elements (microlenses) 61 arranged in the x direction. A direction of an optical axis of each lens element 61 coincides with the z direction. Here, the lens elements 61 are formed in a central region in the x direction and the y direction of the second lens array 6.

The first lens array 4 (FIGS. 5A to 5F) and the second lens array 6 have the same shape and are in such a positional relationship that the second lens array 6 is turned by 180° about an axis of rotation in the x direction relative to the first lens array 4 and is then shifted in the x direction by an amount of P/2 (a half pitch). Accordingly, the optical axes of the lens elements 41 and 61 that are opposed to one another in the z direction coincide with one another. The first lens array 4 and the second lens array 6 have a role in forming an erect equal-magnification image of light emitting elements 81 (to be described later) of the board 8.

The contact surface 69 having a high degree of flatness of 10 μm or below, for example, is formed on the upper surface part 6a in such a way as to surround a region to dispose the lens elements 61 (that is, a central region). The contact surface 69 is a surface that is parallel to the x-y plane and designed to come into contact with the contact surface 59 (FIG. 6F) of the intermediate light shielding plate 5.

The pins 63 projecting in the +z direction are formed on two ends in the x direction of the upper surface part 6a, respectively. The pins 63 are portions to engage with the grooves 53 (FIG. 6F) of the intermediate light shielding plate 5.

As illustrated in FIGS. 7B and 7D, the protrusions 65 projecting in the +z direction are formed at the center in the x direction of the upper surface part 6a. Here, the two protrusions 65 are formed at two ends in the y direction of a region to dispose the lens elements 61 (that is, a central region). The protrusions 65 are portions to engage with the recesses 55 (FIG. 6F) of the intermediate light shielding plate 5.

As illustrated in FIG. 7F, a contact surface 68 having a high degree of flatness of 10 μm or below, for example, is formed along two ends in the y direction of the lower surface part 6b. The contact surface 68 is a surface that is parallel to the x-y plane and designed to come into contact with a contact surface 78 (to be described later) of the incident side light shielding plate 7.

Grooves 62 are formed in two ends in the x direction of the lower surface part 6b, respectively. Each groove 62 has an elongated shape that is long in the x direction. The grooves 62 are portions to engage with pins 72 (to be described later) of the incident side light shielding plate 7.

Recesses 64 are formed at the center in the x direction of the lower surface part 6b. Here, the two recesses 64 are formed at two ends in the y direction of the lower surface part 6b. The recesses 64 are portions to engage with protrusions 74 (to be described later) of the incident side light shielding plate 7.

The wall surface portions 66 projecting outward in the y direction are formed at regular intervals in the x direction on the two side wall parts 6c, respectively. The wall surface portions 66 are surfaces that are parallel to the x-y plane and designed to come into contact with the projections 57 (FIG. 6F) of the intermediate light shielding plate 5 and projections 76 (to be described later) of the incident side light shielding plate 7.

<Configuration of Incident Side Light Shielding Plate 7>

Figure 8:
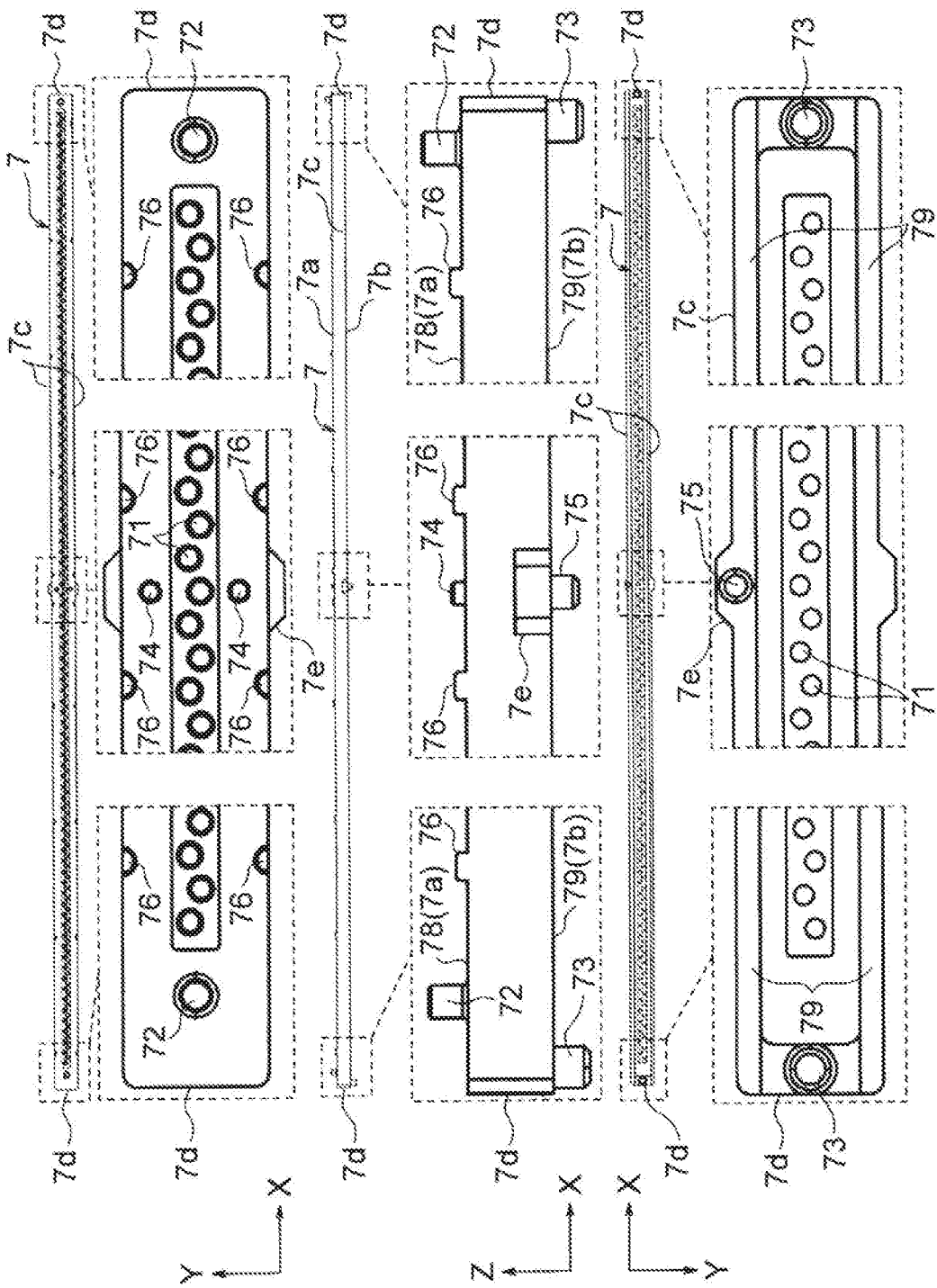
FIG. 8A is a diagram illustrating a top view.
FIG. 8B is a diagram illustrating an enlarged top view.
FIG. 8C is a diagram illustrating a side view.
FIG. 8D is a diagram illustrating an enlarged side view.
FIG. 8E is a diagram illustrating a bottom view.
FIG. 8F is a diagram illustrating an enlarged bottom view of an incident side light shielding plate of the exposure device.

Next, a configuration of the incident side light shielding plate 7 is described. FIG. 8A is a diagram illustrating a top view of the incident side light shielding plate 7 and FIG. 8B is a diagram illustrating an enlarged view illustrating an end portion in the −x direction, a central portion in the x direction, and an end portion in the +x direction of the incident side light shielding plate 7 which are illustrated in FIG. 8A, respectively. FIG. 8C is a diagram illustrating a side view of the incident side light shielding plate 7 and FIG. 8D is a diagram illustrating an enlarged view illustrating the end portion in the −x direction, the central portion in the x direction, and the end portion in the +x direction of the incident side light shielding plate 7 which are illustrated in FIG. 8C, respectively. FIG. 8E is a diagram illustrating a bottom view of the incident side light shielding plate 7 and FIG. 8F is a diagram illustrating an enlarged view illustrating the end portion in the −x direction, the central portion in the x direction, and the end portion in the +x direction of the incident side light shielding plate 7 which are illustrated in FIG. 8E, respectively.

The incident side light shielding plate 7 is made of a resin such as polycarbonate. Instead, acrylonitrile butadiene styrene (ABS) resin may be used. Here, when the incident side light shielding plate 7 is made of polycarbonate, its linear expansion coefficient is $70 \times 10^{-6}$/K. The intermediate light shielding plate 5 and the incident side light shielding plate 7 are preferably made of the same material.

The incident side light shielding plate 7 includes openings 71 arranged in the x direction. A position of each opening 71 corresponds to a position of the counterpart lens element 61 (FIGS. 7B and 7F). Each opening 71 has a truncated conical shape having the center aligned with the axis in the z direction and the inside diameter spreading in the +z direction. The openings 71 are formed in a central region in the x direction and the y direction of the incident side light shielding plate 7.

The incident side light shielding plate 7 has functions to secure an optimum distance between the second lens array 6 and the board 8, and to shut off stray light originating from light beams incident from the board 8 into the second lens array 6.

As illustrated in FIGS. 8A and 8C, the incident side light shielding plate 7 includes an upper surface part 7a located at an end portion in the +z direction, a lower surface part 7b located at an end portion in the −z direction, two side wall parts 7c located at two ends in the y direction, and two end surface parts 7d located at two ends in the x direction. In the meantime, a width (that is, a dimension in the y direction) of the incident side light shielding plate 7 is larger than the width of the first lens array 4 and the width of the second lens array 6.

As illustrated in FIG. 8B, the contact surface 78 having a high degree of flatness of 10 μm or below, for example, is formed on the upper surface part 7a in such a way as to surround a region to dispose the openings 71 (that is, the central region). The contact surface 78 is a surface that is parallel to the x-y plane and designed to come into contact with the contact surface 68 (FIG. 7F) of the second lens array 6.

As illustrated in FIGS. 8B and 8D, the pins 72 are formed at two ends in the x direction of the upper surface part 7a, respectively. The pins 72 are portions to engage with the grooves 62 (FIG. 7F) of the second lens array 6 mentioned above.

The protrusions 74 are formed at the center in the x direction of the upper surface part 7a. Here, the two protrusions 74 are formed on two sides in the y direction of the region to dispose the openings 71 (the central region). The protrusions 74 are portions to engage with the recesses 64 (FIG. 7F) of the second lens array 6 mentioned above.

The projections 76 projecting in the +z direction are formed at two ends in the y direction and arranged in the x direction of the upper surface part 7a. Here, each projection 76 has a semi-cylindrical shape with its curved surface oriented inward in the y direction. An interval between two of the projections 76 opposed to each other in the y direction is slightly larger than the width of the second lens array 6. The projections 76 are guide portions that come into contact with the wall surface portions 66 of the second lens array 6 from outside in the y direction.

As illustrated in FIGS. 8D and 8F, a contact surface 79 having a high degree of flatness of 10 μm or below, for example, is formed along two ends in the y direction of the lower surface part 7b. The contact surface 79 is a surface that is parallel to the x-y plane and designed to come into contact with a front surface 8a (to be described later) of the board 8.

Pins 73 projecting in the −z direction are formed at two ends in the x direction of the lower surface part 7b, respectively. The pins 73 are portions to engage with grooves 82 (to be described later) of the board 8.

A protrusion 75 projecting in the −z direction is formed at the center in the x direction of the lower surface part 7b. Here, the single protrusion 75 is formed at one end in the y direction (an end portion in the −y direction in this case) of the lower surface part 7b. The protrusion 75 is a portion to engage with a groove 85 (to be described later) of the board 8.

<Configuration of Board 8>

Figure 9:
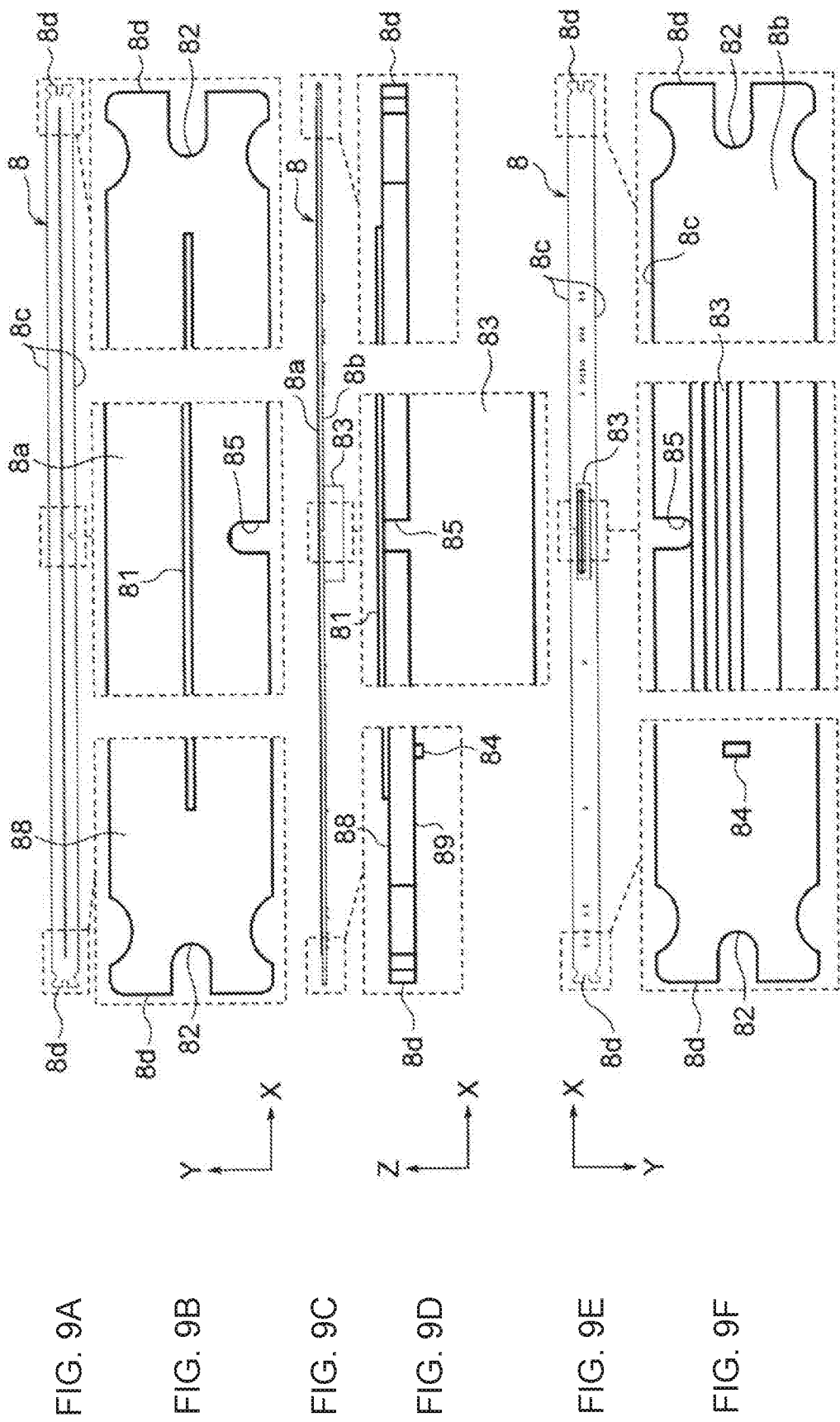
FIG. 9A is a diagram illustrating a top view.
FIG. 9B is a diagram illustrating an enlarged top view.
FIG. 9C is a diagram illustrating a side view.
FIG. 9D is a diagram illustrating an enlarged side view.
FIG. 9E is a diagram illustrating a bottom view.
FIG. 9F is a diagram illustrating an enlarged bottom view of a board of the exposure device.

Next, a configuration of the board 8 is described. FIG. 9A is a diagram illustrating a top view of the board 8 and FIG. 9B is a diagram illustrating an enlarged view illustrating an end portion in the −x direction, a central portion in the x direction, and an end portion in the +x direction of the board 8 which are illustrated in FIG. 9A, respectively. FIG. 9C is a diagram illustrating a side view of the board 8 and FIG. 9D is a diagram illustrating an enlarged view illustrating the end portion in the −x direction, the central portion in the x direction, and the end portion in the +x direction of the board 8 which are illustrated in FIG. 9C, respectively. FIG. 9E is a diagram illustrating a bottom view of the board 8 and FIG. 9F is a diagram illustrating an enlarged view illustrating the end portion in the −x direction, the central portion in the x direction, and the end portion in the +x direction of the board 8 which are illustrated in FIG. 9E, respectively.

The board 8 is a printed board which is made of Flame Retardant Type 4 (FR4), namely, a glass epoxy board, for example. When the board 8 is made of the FR4, its linear expansion coefficient is $15 \times 10^{-6}$/K.

As illustrated in FIGS. 9A and 9C, the board 8 includes the front surface 8a oriented in the +z direction, a rear surface 8b oriented in the −z direction, two side surfaces 8c located at two ends in the y direction, and two end surfaces 8d located at two ends in the x direction. A width (that is, a dimension in the y direction) of the board 8 is larger than the width of the intermediate light shielding plate 5 and the width of the incident side light shielding plate 7.

As illustrated in FIG. 9B, the light emitting elements 81 each formed from a light emitting diode (LED) are arranged in the x direction on the front surface 8a of the board 8. The light emitting elements 81 are arranged in the x direction at an arrangement pitch of 600 dpi or 1200 dpi, for instance. Drive circuits may also be formed integrally with the light emitting elements 81.

As illustrated in FIGS. 9E and 9F, a connector 83 for establishing connection to a main body of the image formation apparatus 1 and an electronic component 84 used for driving the light emitting elements 81 are mounted on the rear surface 8b of the board 8.

The grooves 82 are formed at two ends in the x direction of the board 8. The grooves 82 are portions to engage with the pins 73 of the incident side light shielding plate 7.

The groove 85 is formed at the center in the x direction of the board 8. Here, the single groove 85 is formed at one end in the y direction (an end portion in the −y direction) of the board 8. The groove 85 is a portion to engage with the protrusion 75 (FIG. 8F) of the incident side light shielding plate 7.

<Configuration of Insulating Film 9>

Next, the insulating film 9 is described. The insulating film 9 illustrated in FIG. 2 is an electrically insulating film. The shape of the insulating film 9 is a rectangle herein and its area is smaller than the area of the inside of the holder 2. The insulating film 9 is fixed (bonded) to the open end 2b of the holder 2 with the adhesive 13 supplied to the hole portions 22 of the holder 2.

The insulating film 9 is made of polyethylene terephthalate (PET), for example. When the insulating film 9 is made of PET, its linear expansion coefficient is $15 \times 10^{-6}$/K. The insulating film 9 has a role in protecting the board 8 against electrostatic discharge from outside. Here, a sheet or a plate having insulation properties may be used instead of the insulating film.

<Configuration of Adhesives 11 and 13>

Next, the adhesives 11 and 13 are described. As illustrated in FIG. 2, the cover 3 is fixed (bonded) to the holder 2 by using the adhesive 11. Meanwhile, the insulating film 9 is fixed (bonded) to the holder 2 by using the adhesive 13. Each of the adhesives 11 and 13 is made of an acrylic resin-based ultraviolet (UV) curable resin, for example.

As described later, when the board 8 is detached from the exposure device 10 for reuse, it is desirable that the adhesive 13 be easily destructible after being cured. In this regard, a shear adhesive force of the adhesive 13 is preferably equal to or below 10 MPa under JIS K 6850 measurement method.

<Configuration of Sealing Resins 12 and 14>

Next, the sealing resins 12 and 14 are described. As illustrated in FIG. 2, the sealing resin 12 is provided between the cover 3 and the holder 2. Meanwhile, the sealing resin 14 is provided between the insulating film 9 and the holder 2. Each of the sealing resins 12 and 14 is made of silicone resin, for example. The sealing resins 12 and 14 have roles in avoiding dust penetration into the exposure device 10 and protecting the inside of the exposure device 10 against electrostatic discharge.

<Stacked Body>

Figure 10:
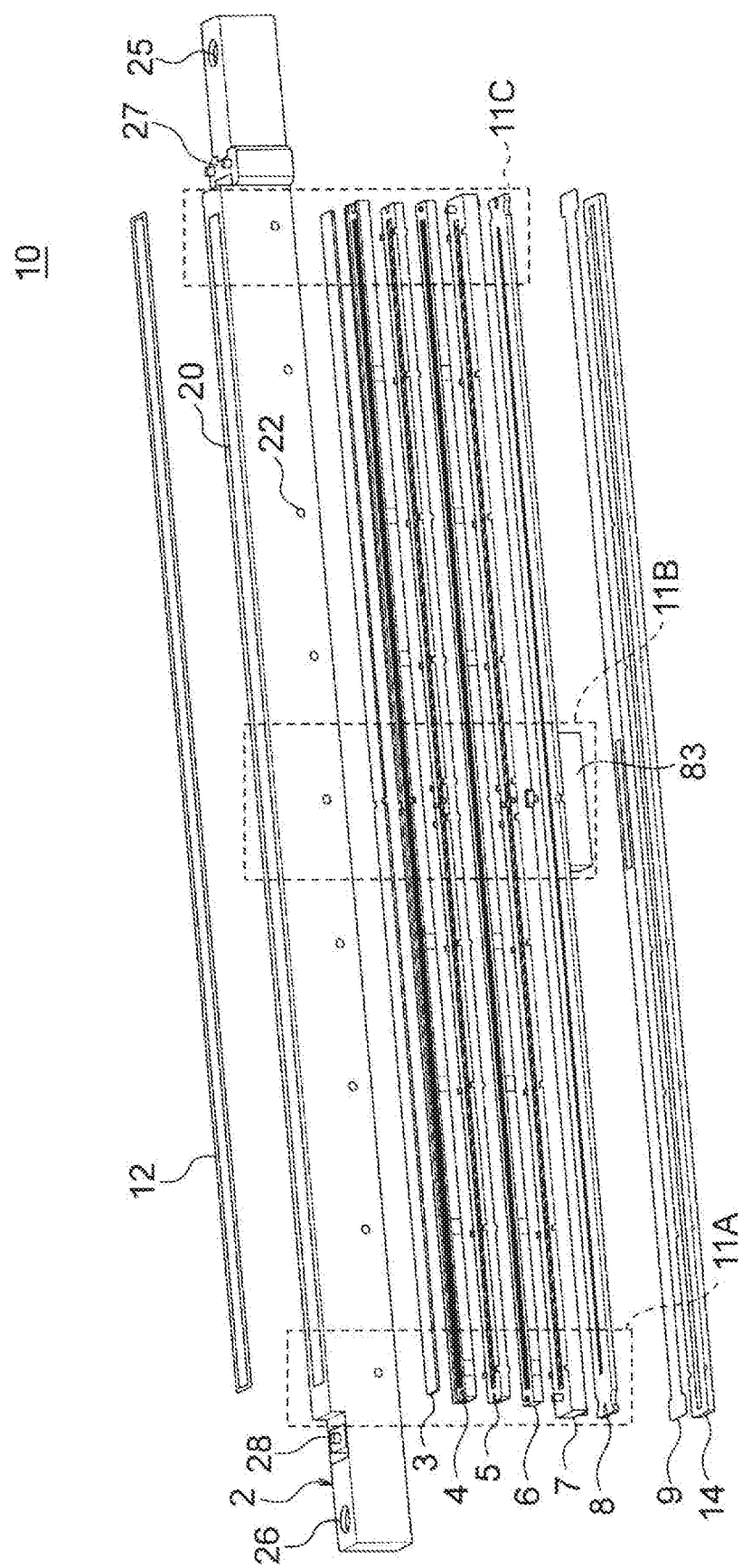
FIG. 10 is a diagram illustrating an exploded perspective view of constituents of the exposure device.
Figure 11:
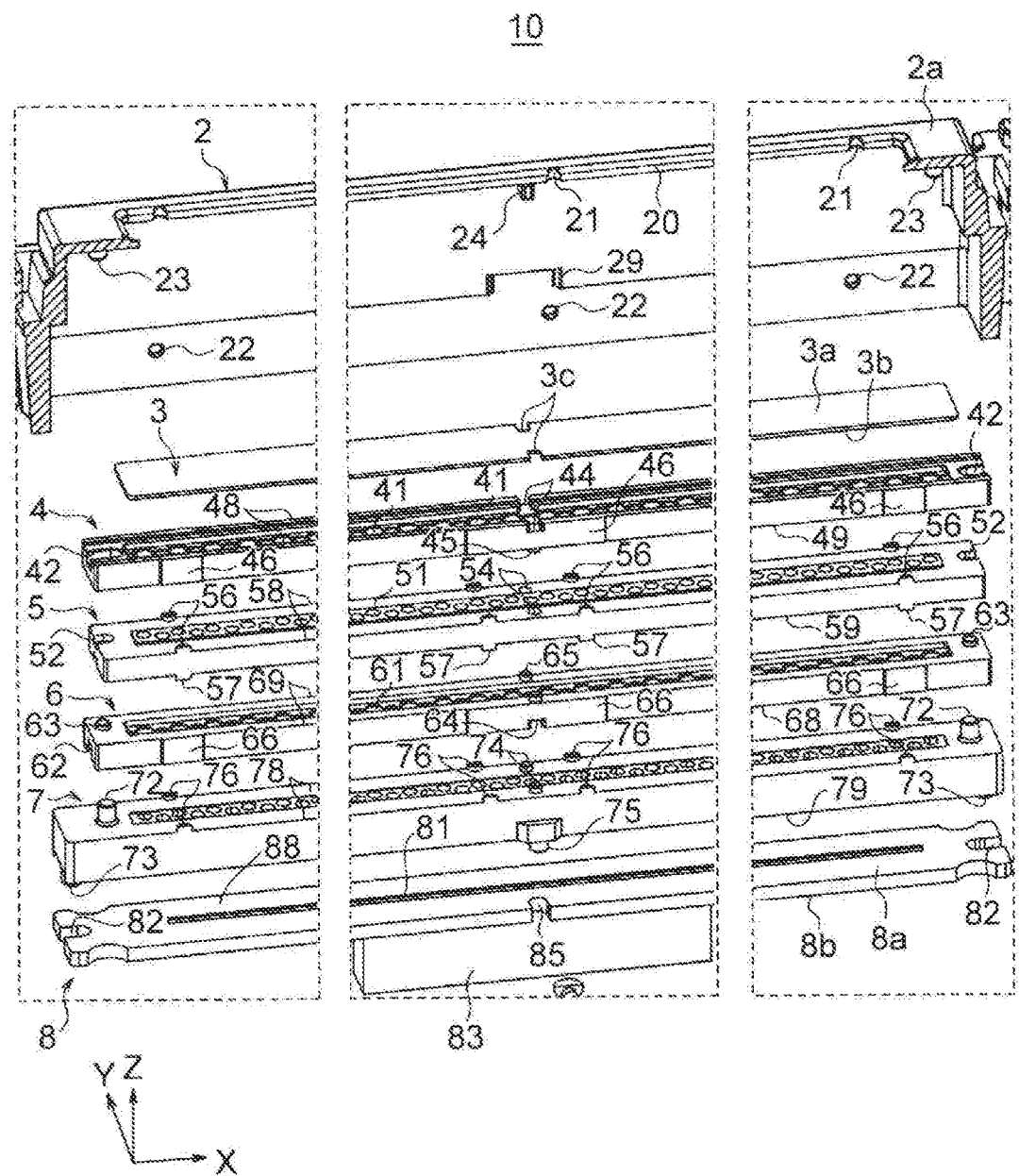
FIG. 11 is a diagram illustrating an enlarged view of the constituents of the exposure device.

FIG. 10 is a diagram illustrating an exploded perspective view illustrating: the stacked body that includes the holder 2, the cover 3, the first lens array 4, the intermediate light shielding plate 5, the second lens array 6, the incident side light shielding plate 7, and the board 8; the insulating film 9; and the sealing resins 12 and 14 described above. FIG. 11 is a diagram illustrating an enlarged view illustrating end portions in the −x direction, central portions in the x direction, and end portions in the +x direction of the holder 2 and of the stacked body which are illustrated in FIG. 10, respectively.

Positioning in the y direction of the respective constituents of the stacked body is described with reference to FIG. 11. First, the pins 23 of the holder 2 and the grooves 42 of the first lens array 4 engage with one another, whereby the position in the y direction of the first lens array 4 is regulated. Meanwhile, the pins 43 (FIG. 5D) of the first lens array 4 and the grooves 52 of the intermediate light shielding plate 5 engage with one another, whereby the position in the y direction of the intermediate light shielding plate 5 is regulated.

Moreover, the grooves 53 (FIG. 6F) of the intermediate light shielding plate 5 and the pins 63 of the second lens array 6 engage with one another, whereby the position in the y direction of the second lens array 6 is regulated. Meanwhile, the grooves 62 (FIG. 7F) of the second lens array 6 and the pins 72 of the incident side light shielding plate 7 engage with one another, whereby the position in the y direction of the incident side light shielding plate 7 is regulated. In the meantime, the pins 73 of the incident side light shielding plate 7 and the grooves 82 of the board 8 engage with one another, whereby the position in the y direction of the board 8 is regulated.

In addition, warpage in the y direction of the first lens array 4 is suppressed by contact of the wall surface portions 46 of the first lens array 4 with the projections 56 of the intermediate light shielding plate 5. Moreover, warpage in the y direction of the second lens array 6 is suppressed by contact of the wall surface portions 66 of the second lens array 6 with the projections 57 of the intermediate light shielding plate 5 and the projections 76 of the incident side light shielding plate 7.

Specifically, the respective positions in the y direction of the first lens array 4, the intermediate light shielding plate 5, the second lens array 6, the incident side light shielding plate 7, and the board 8 are regulated based on the pins 23 of the holder 2. The above-mentioned engaging parts establish highly accurate engagement to satisfy maximum tolerances of about 10 μm in the y direction.

On the other hand, the above-mentioned engaging parts retain sufficient allowances in the x direction. Such an amount of allowance in the x direction is preferably set to about 0.5 mm, for example.

Next, positioning in the x direction of the respective constituents of the stacked body is described with reference to FIG. 11. First, the protrusions 24 of the holder 2 and the recesses 44 of the first lens array 4 engage with one another, whereby the position of the center in the x direction of the first lens array 4 is regulated. Meanwhile, the protrusions 45 of the first lens array 4 and the recesses 54 of the intermediate light shielding plate 5 engage with one another, whereby the position of the center in the x direction of the intermediate light shielding plate 5 is regulated.

Moreover, the recesses 55 (FIG. 6F) of the intermediate light shielding plate 5 and the protrusions 65 of the second lens array 6 engage with one another, whereby the position of the center in the x direction of the second lens array 6 is regulated. Meanwhile, the recesses 64 of the second lens array 6 and the protrusions 74 of the incident side light shielding plate 7 engage with one another, whereby the position of the center in the x direction of the incident side light shielding plate 7 is regulated. In the meantime, the protrusion 75 of the incident side light shielding plate 7 engages with the groove 85 of the board 8, whereby the position of the center in the x direction of the board 8 is regulated.

Specifically, the respective positions of the center in the x direction of the first lens array 4, the intermediate light shielding plate 5, the second lens array 6, the incident side light shielding plate 7, and the board 8 are regulated based on the protrusions 24 of the holder 2. The above-mentioned engaging parts establish highly accurate engagement to satisfy maximum tolerances of about 10 μm in the x direction.

Next, positioning in the z direction of the respective constituents of the stacked body is described with reference to FIG. 11. The cover 3 is fixed to the holder 2 at a high degree of flatness by using a jig 300 (FIG. 13) to be described later. The contact surface 48 of the first lens array 4 comes into contact with the reference surface 3b of the cover 3, whereby the position in the z direction of the first lens array 4 is regulated. Meanwhile, the contact surface 58 of the intermediate light shielding plate 5 comes into contact with the contact surface 49 of the first lens array 4, whereby the position in the z direction of the intermediate light shielding plate 5 is regulated.

Moreover, the contact surface 69 of the second lens array 6 comes into contact with the contact surface 59 of the intermediate light shielding plate 5, whereby the position in the z direction of the second lens array 6 is regulated. Meanwhile, the contact surface 78 of the incident side light shielding plate 7 comes into contact with the contact surface 68 of the second lens array 6, whereby the position in the z direction of the incident side light shielding plate 7 is regulated. In the meantime, the front surface 8a of the board 8 comes into contact with the contact surface 79 of the incident side light shielding plate 7, whereby the position in the z direction of the board 8 is regulated.

<Assembling Method>

Figure 12:
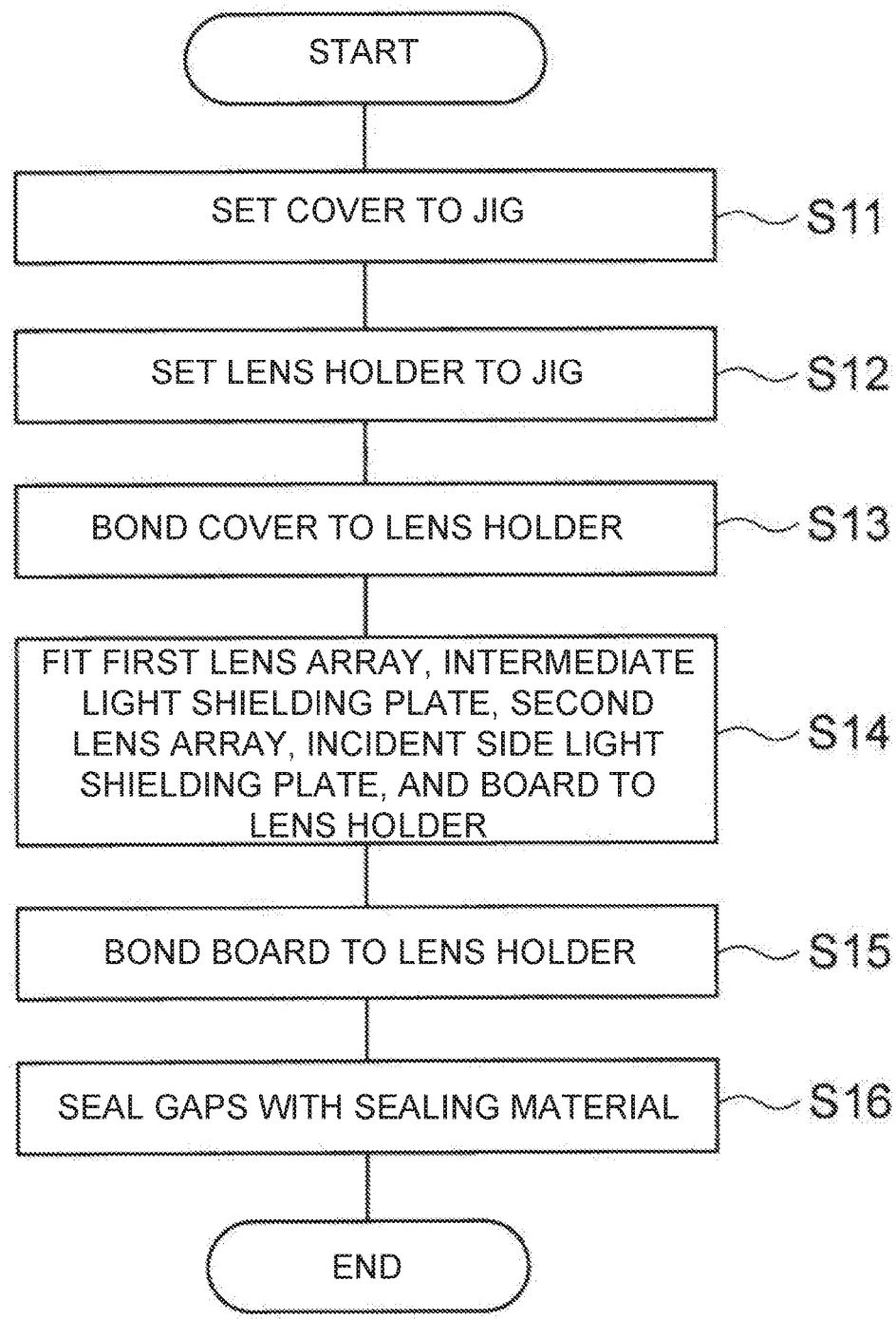
FIG. 12 is a flowchart illustrating an assembly process for the exposure device.

Next, a method of assembling the exposure device 10 is described. FIG. 12 is a flowchart illustrating an assembly process for the exposure device 10. When the exposure device 10 is assembled, the cover 3 is positioned relative to the holder 2 and is fixed thereto to begin with (steps S11 to S13).

Figure 13:
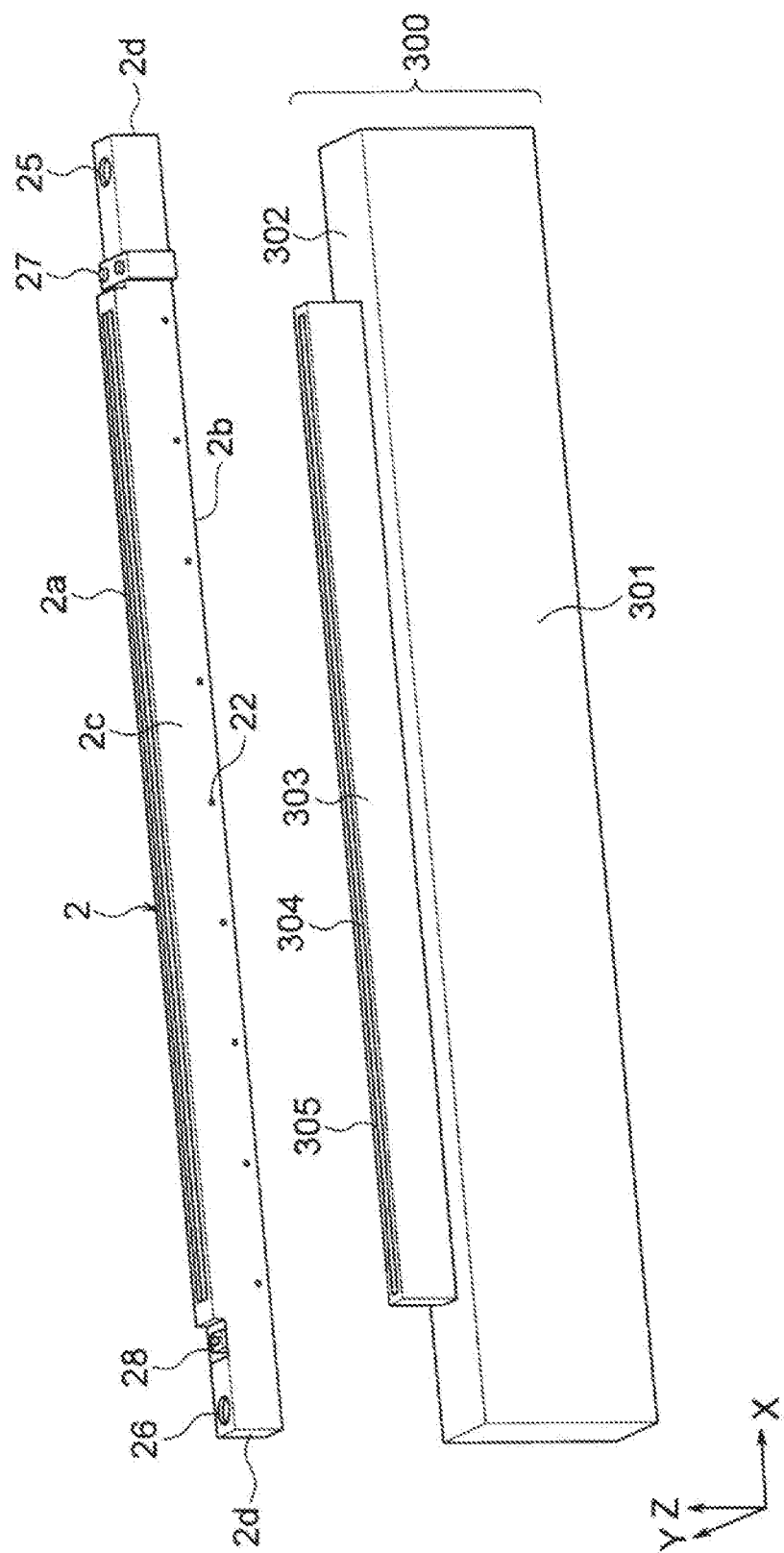
FIG. 13 is a diagram illustrating a perspective view of a jig used in the assembly process for the exposure device.

FIG. 13 is a diagram illustrating a schematic view in which the jig 300 for positioning and fixing the cover 3 to the holder 2 is illustrated together with the holder 2. The jig 300 includes a support base 301 and a reference portion 303 provided on the support base 301. Each of the support base 301 and the reference portion 303 is long in one direction in the horizontal plane. A reference surface 305 having a high degree of flatness of 10 μm or below is provided on an upper surface of the reference portion 303. It is preferable that the area of the reference surface 305 be substantially equal to the area of the cover 3.

A suction groove 304 is formed in the reference surface 305 of the reference portion 303. The suction groove 304 is connected to a pump (a suction device) through a not-illustrated passage. The suction groove 304 is formed substantially in the entire area in the longitudinal direction of the reference surface 305.

Figure 14:
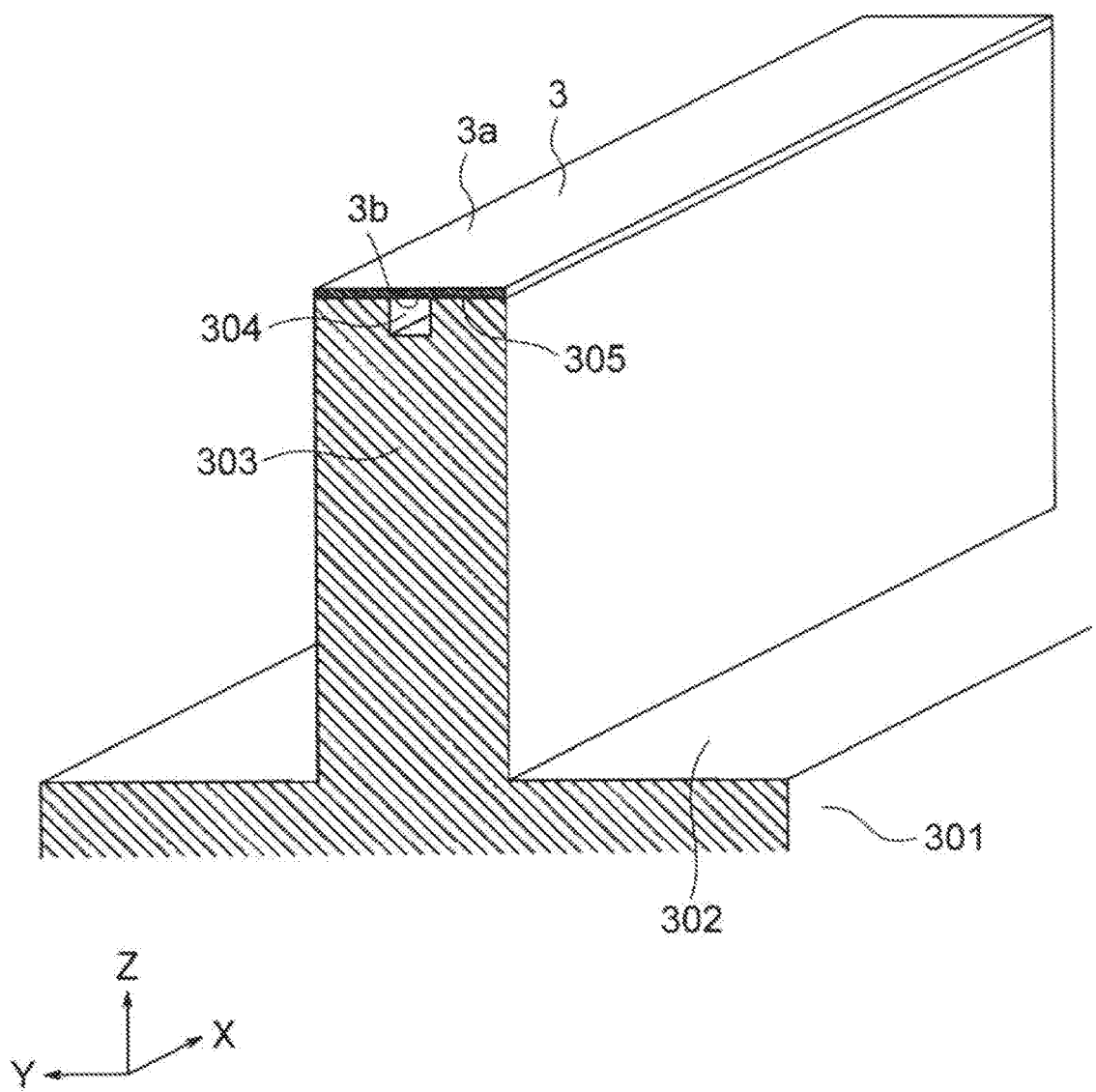
FIG. 14 is a diagram illustrating a partially sectioned perspective view illustrating a state of holding a cover with the jig illustrated in FIG. 13.
Figure 15:
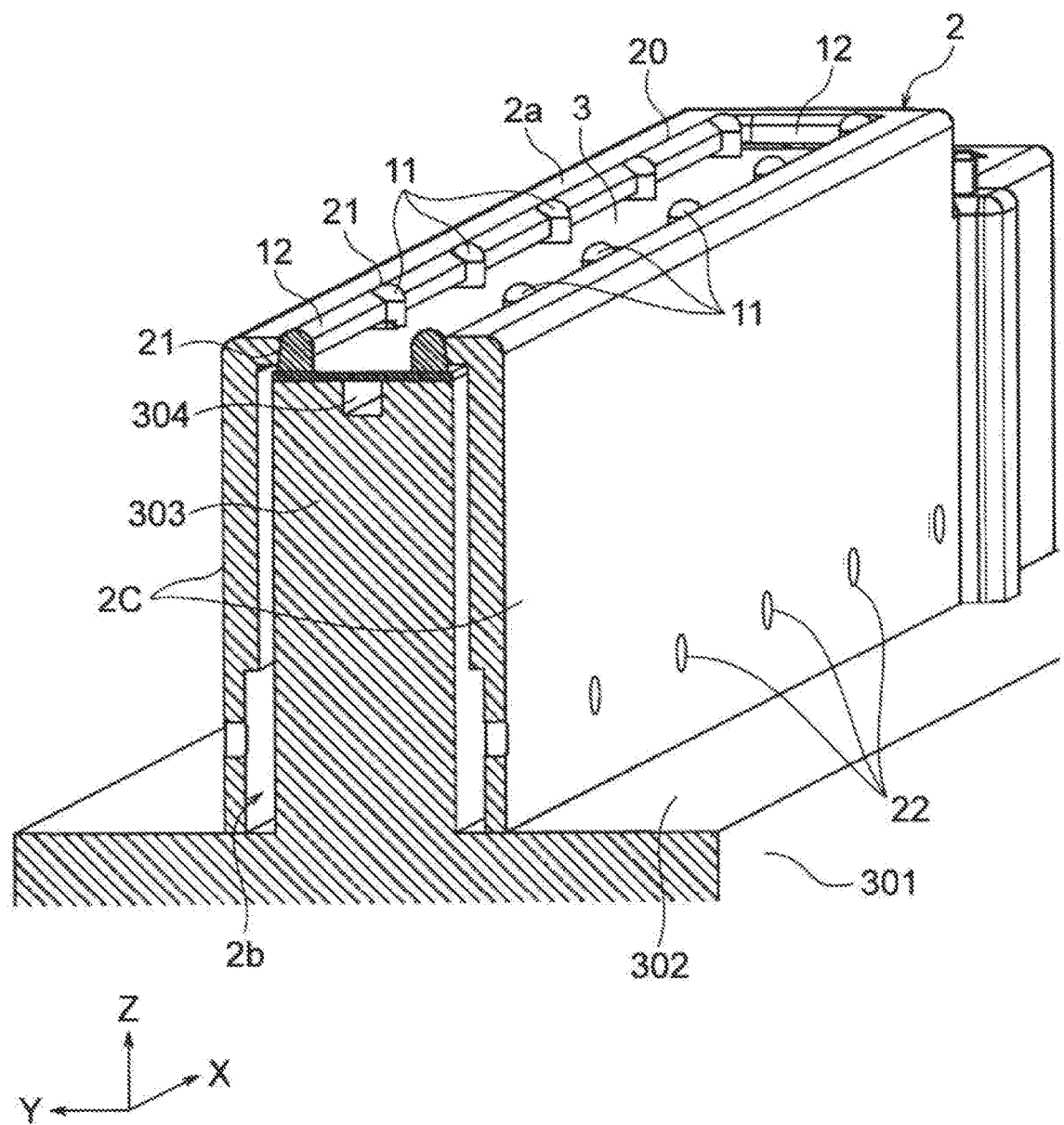
FIG. 15 is a diagram illustrating a partially sectioned perspective view illustrating a step of fixing the cover to a lens holder by using the jig illustrated in FIG. 13.

FIGS. 14 and 15 are schematic diagrams for explaining a method of fixing the cover 3 by using the jig 300. As illustrated in FIG. 14, the cover 3 is put on the reference surface 305 of the jig 300 while aiming the reference surface 3b side downward. As the pump performs suction in this state, an air pressure inside the suction groove 304 is reduced and the cover 3 is sucked onto the reference surface 305 (step S11).

Subsequently, as illustrated in FIG. 15, the holder 2 is fitted to the jig 300 in such a way as to overlay the holder 2 on the reference portion 303 with its open end 2b side aimed downward (step S12). A height of the reference portion 303 is set such that a small clearance is defined between the cover 3 on the reference surface 305 and the upper surface part 2a of the holder 2 in the state where lower ends of the side walls 2c of the holder 2 are in contact with an upper surface 302 of the support base 301.

The adhesive 11 is supplied to the cutouts 21 in the upper surface part 2a of the holder 2 in this state. Then, the adhesive 11 supplied to the cutouts 21 is cured by ultraviolet irradiation (step S13), so as to fix the cover 3 to the holder 2. After the cover 3 is fixed to the holder 2, the suction by the pump is stopped and the holder 2 and the cover 3 are detached from the jig 300.

Thus, the cover 3 is fixed to the holder 2 while retaining a high degree of flatness equivalent to that of the reference surface 305 of the jig 300. While the lower ends of the side walls 2c of the holder 2 are brought into contact with the upper surface 302 of the support base 301 in FIG. 15, the holder 2 may be held by using a different method. For example, the holder 2 may be held by using two stoppers that come into contact with two ends in the longitudinal direction of the holder 2.

Figure 16:
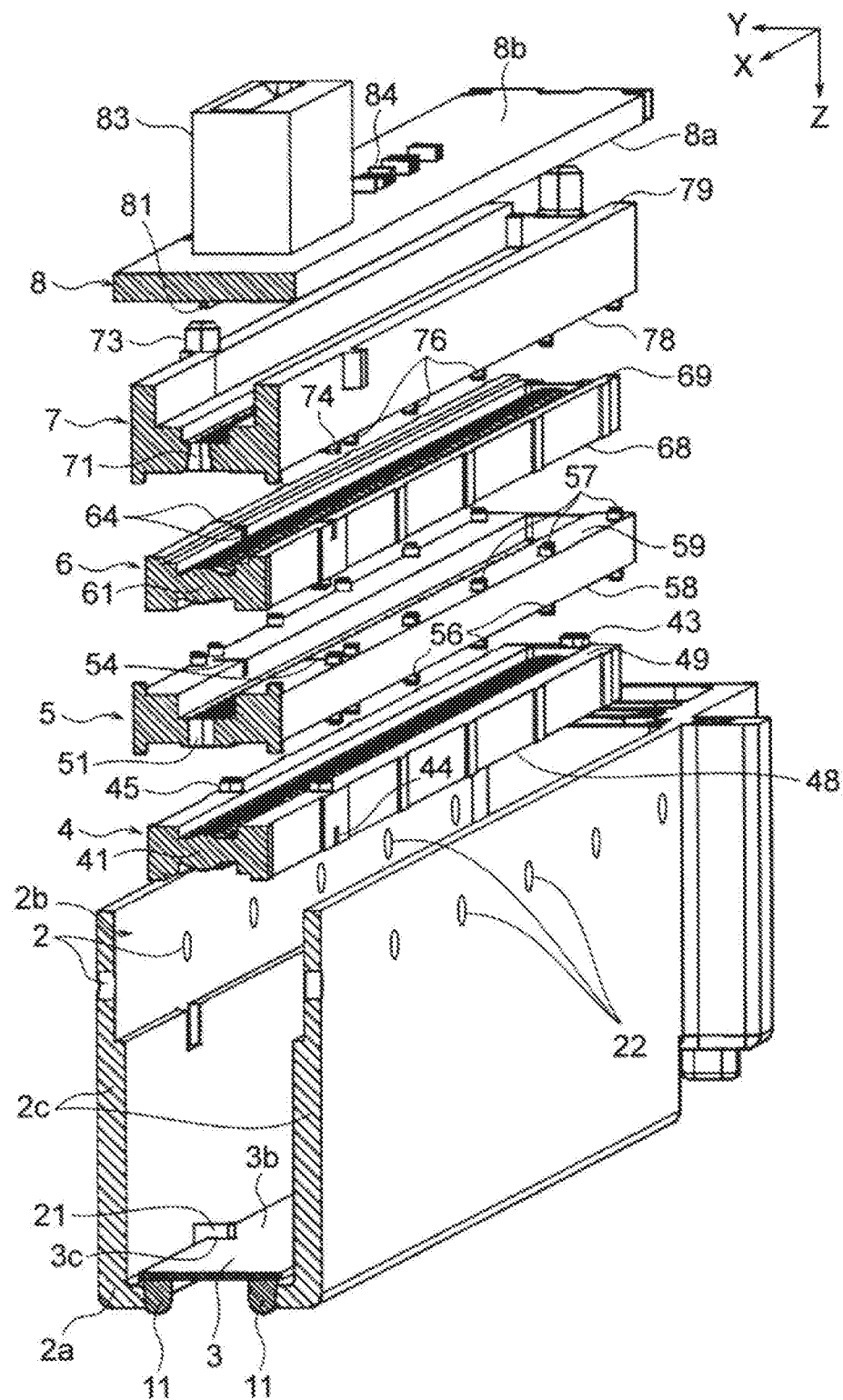
FIG. 16 is a diagram illustrating a partially sectioned perspective view illustrating a step of attaching the constituents of the exposure device to a holder.
Figure 17:
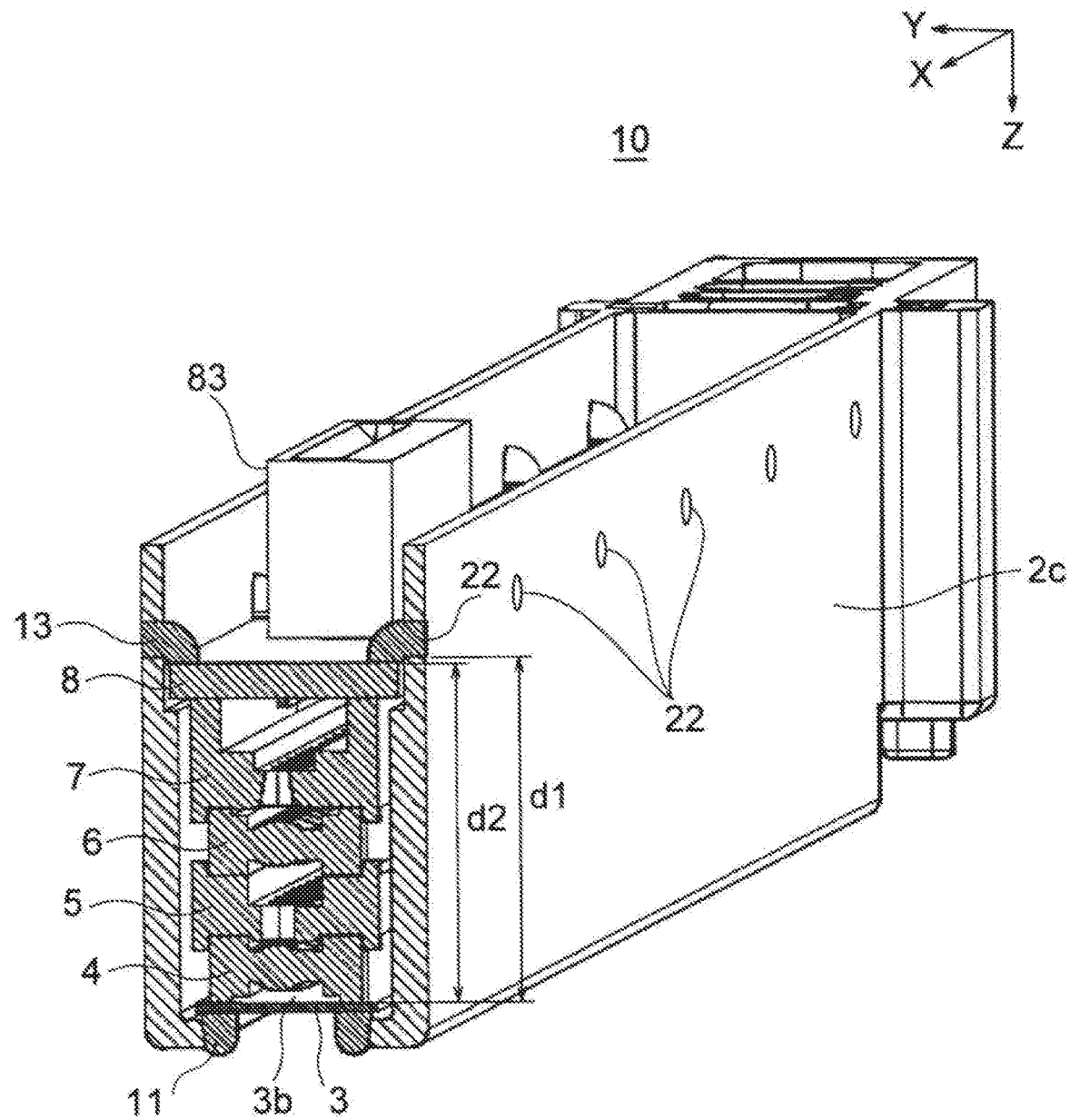
FIG. 17 is a diagram illustrating another partially sectioned perspective view illustrating the step of attaching the constituents of the exposure device to the holder.

FIGS. 16 and 17 are diagrams illustrating partially sectioned perspective views illustrating a step of attaching the respective constituents to the holder 2. After the cover 3 is fixed to the holder 2, the holder 2 is turned over in such a way as to aim the upper surface part 2a downward and to aim the open end 2b upward as illustrated in FIG. 16. Thereafter, the first lens array 4, the intermediate light shielding plate 5, the second lens array 6, the incident side light shielding plate 7, and the board 8 are stacked in this order on the reference surface 3b of the cover 3 (step S14).

The positioning in the x direction as well as the y direction of the first lens array 4, the intermediate light shielding plate 5, the second lens array 6, the incident side light shielding plate 7, and the board 8 relative to the holder 2 is established as described earlier. In the meantime, by biasing the board 8 toward the cover 3 during the stacking operation, the positioning in the z direction of the first lens array 4, the intermediate light shielding plate 5, the second lens array 6, the incident side light shielding plate 7, and the board 8 relative to the holder 2 is established by the contact of the respective contact surfaces.

Thereafter, the adhesive 13 is supplied through the hole portions 22 in the holder 2 to boding positions, and then the adhesive 13 is cured by ultraviolet irradiation to fix the board 8 to the holder 2 by the cured adhesive 13 in contact with both the board 8 and the holder 2 as illustrated in FIG. 17 (step S15). Thus, the cover 3, the first lens array 4, the intermediate light shielding plate 5, the second lens array 6, the incident side light shielding plate 7, and the board 8 are fixed to the holder 2.

Then, a gap between the cover 3 and the holder 2 is sealed with the sealing resin 12 (FIG. 2). Meanwhile, the insulating film 9 is put on the board 8 and a gap between the board 8 and the insulating film 9 and the holder 2 is sealed with the sealing resin 14 (FIG. 2). In this way, the assembly of the exposure device 10 is completed.

<Operation>

Next, a description is given of an operation of the exposure device 10 configured as explained above. The exposure device 10 includes the holder 2, the cover 3, and the board 8 each of which has a relatively small linear expansion coefficient, and the first lens array 4, the intermediate light shielding plate 5, the second lens array 6, and the incident side light shielding plate 7 each of which has a relatively large linear expansion coefficient. Accordingly, the mere stacking and bonding of these constituents with an adhesive may cause warpage of the stacked body or breakage of bonded sections due to a change in temperature.

In this configuration, the first lens array 4, the intermediate light shielding plate 5, the second lens array 6, and the incident side light shielding plate 7 having the large linear expansion coefficients are not bonded with an adhesive to the holder 2 and the like, but are instead held in a state of being sandwiched in the z direction between the cover 3 and the board 8.

For this reason, even if any of the first lens array 4, the intermediate light shielding plate 5, the second lens array 6, and the incident side light shielding plate 7 significantly expands or contracts with a change in temperature, such a constituent can slide in the x direction. Thus, it is possible to suppress the warpage of the stacked body or breakage of the bonded sections.

Here, among the above-described constituents of the exposure device 10, the cover 3 and the board 8 are fixed to the holder 2 by using the adhesives 11 and 13. Accordingly, it is desirable to set a small difference in linear expansion coefficient between the cover 3 and the holder 2 as well as between the board 8 and the holder 2.

For example, in the case of the exposure device 10 having the length adaptable to recording media in A4 size, it is possible to reduce differences in amount of expansion or contraction with a change in temperature among the holder 2, the cover 3, and the board 8 to low values when an absolute value of a difference in linear expansion coefficient between the board 8 and the holder 2 is equal to or below $12 \times 10^{-6}$/K and when an absolute value of a difference in linear expansion coefficient between the cover 3 and the holder 2 is equal to or below $12 \times 10^{-6}$/K. In other words, it is thus possible to improve an effect to suppress warpage of the stacked body or breakage of the bonded sections.

When the holder 2 is made of the liquid crystal polymer (the linear expansion coefficient: $8 \times 10^{-6}$/K), the cover 3 is made of PET (the linear expansion coefficient: $15 \times 10^{-6}$/K), and the board 8 is made of FR4 (the linear expansion coefficient: $15 \times 10^{-6}$/K), the absolute value of the difference in linear expansion coefficient between the board 8 and the holder 2 is equal to or below $7 \times 10^{-6}$/K and the absolute value of the difference in linear expansion coefficient between the cover 3 and the holder 2 is equal to or below $7 \times 10^{-6}$/K. Accordingly, the above-mentioned requirements are satisfied.

Now, a description is given of detachment of the board 8 from the holder 2. If a defect of a portion other than the board 8 is found at a shipping inspection after the assembly of the exposure device 10, then it is preferable to detach the board 8 from the exposure device 10 for reuse. To this end, the adhesive 13 that fixes the board 8 needs to be easily destructible.

Accordingly, as illustrated in FIG. 17, the hole portions 22 (the portions to which the adhesive 13 is supplied) in the holder 2 are formed on the opposite side of the cover 3 with respect to the board 8 in the z direction. To be more precise, the hole portions 22 are arranged such that a distance d1 from the reference surface 3b of the cover 3 to each hole portion 22 is greater than a distance d2 from the reference surface 3*b* to the rear surface 8*b* (that is, the surface on the opposite side of the reference surface 3*b*) of the board 8 in the z direction.

Figure 18:
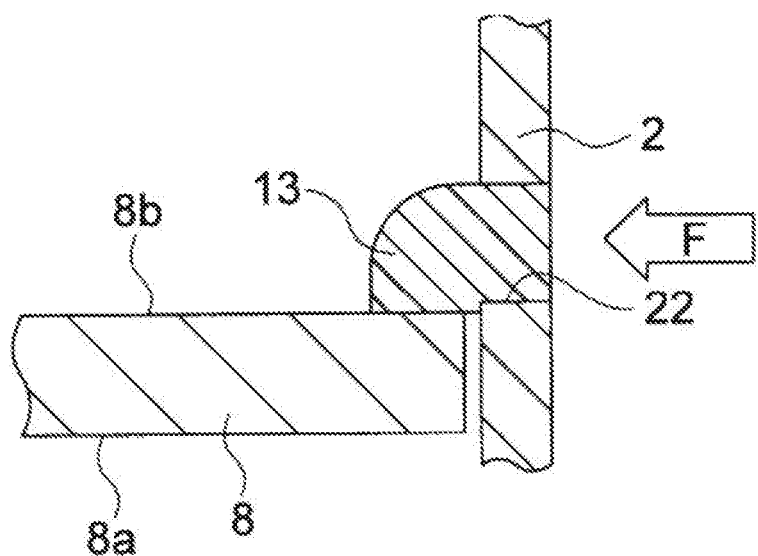
FIG. 18 is a schematic diagram to explain a method of destroying an adhesive that fixes the board to the holder.

For this reason, when an external force F is applied in the y direction from the outside of the holder 2 to the adhesive 13 in the hole portions 22 by using a jig as schematically illustrated in FIG. 18, the adhesive 13 is prone to come out from the hole portions 22 to the rear surface 8*b* side of the board 8. In other words, it is possible to destroy the adhesive 13 easily. This makes it possible to detach the board 8 from the holder 2 and to reuse the board 8.

In the meantime, the detachment of the board 8 from the holder 2 also makes it possible to detach the first lens array 4, the intermediate light shielding plate 5, the second lens array 6, and the incident side light shielding plate 7 from the holder 2 easily. Thus, these constituents are also reusable.

In this example, the reference surface 3*b* of the cover 3 fixed to the holder 2 is used as the position reference in the z direction of each of the first lens array 4, the intermediate light shielding plate 5, the second lens array 6, the incident side light shielding plate 7, and the board 8. However, the embodiment is not limited only to this configuration. For instance, a reference surface may be formed by machining the holder 2 instead of providing the cover 3. Alternatively, a surface of the adhesive 11 may be used as a reference surface without providing the cover 3.

In the meantime, a Selfoc (registered trademark) lens array may be used instead of the stacked body of the first lens array 4, the intermediate light shielding plate 5, the second lens array 6, and the incident side light shielding plate 7. In this case, the Selfoc lens array as an optical system and a given member may be sandwiched in the z direction and held between the cover 3 and the board 8. The given member is provided in order to maintain a clearance between the Selfoc lens array and the board 8 and to avoid interference between the Selfoc lens array and the light emitting elements 81 on the board 8.

Meanwhile, the positioning at the center in the x direction of the first lens array 4, the intermediate light shielding plate 5, the second lens array 6, the incident side light shielding plate 7, and the board 8 is achieved by the engagement of the protrusions with the recesses provided to the respective constituents. However, the relation between the protrusions and the recesses may be inverted or a relation other than the combination of the protrusions and the recesses may be used instead. In addition, it is not essential to conduct the positioning strictly at the center in the x direction, and the constituents may be positioned nearly at the center in the x direction (in other words, at regions except the neighborhoods of the two ends in the x direction).

In the meantime, the positioning in the y direction of the first lens array 4, the intermediate light shielding plate 5, the second lens array 6, the incident side light shielding plate 7, and the board 8 is achieved by the engagement of the pins with the grooves provided to the respective constituents. However, the relation between the pins and the grooves may be inverted or a relation other than the combination of the pins and the grooves may be used instead.

<Effects>

As described above, the exposure device 10 includes: a holding member (the holder 2 and the cover 3) provided with the reference surface 3*b*; an optical system (the first lens array 4, the intermediate light shielding plate 5, the second lens array 6, and the incident side light shielding plate 7) being in contact with the reference surface 3*b* and slidable in the x direction parallel to the reference surface 3*b*; and the board 8 fixed to the holding member (2 and 3) in such a way as to sandwich the optical system (4 to 7) between the board 8 and the reference surface 3*b*. Since the optical system (4 to 7) is slidable relative to the holding member (2 and 3), it is possible to suppress warpage of the stacked body or breakage of the bonded sections due to a change in temperature.

Meanwhile, the optical system includes the first lens array 4 being slidable in the x direction relative to the reference surface 3*b*, the intermediate light shielding plate 5 being slidable in the x direction relative to the first lens array 4, the second lens array 6 being slidable in the x direction relative to the intermediate light shielding plate 5, and the incident side light shielding plate 7 being slidable in the x direction relative to the second lens array 6, which are stacked in this order from the reference surface 3*b* side. Accordingly, it is possible to suppress warpage attributable to the differences in linear expansion coefficient among the constituents. In the meantime, since the first lens array 4, the intermediate light shielding plate 5, the second lens array 6, and the incident side light shielding plate 7 can be stacked on the reference surface 3*b* sequentially in this order. Thus, it is possible to reduce the number of steps for assembling the exposure device 10 and to reduce manufacturing costs thereof.

In the meantime, the holder 2 includes the protrusions 24 (regulating portions) that regulate the position in the x direction of the first lens array 4 substantially at the center in the x direction of the first lens array 4. Accordingly, the first lens array 4 can slide while using the protrusions 24 as supporting points.

Meanwhile, the first lens array 4 includes the protrusions 45 (engaging portions) located substantially at the center in the x direction, which engage with the intermediate light shielding plate 5. Accordingly, the intermediate light shielding plate 5 can slide while using the protrusions 45 as supporting points.

In the meantime, the intermediate light shielding plate 5 includes the grooves 53 (engaging portions) located substantially at the center in the x direction, which engage with the second lens array 6. Accordingly, the second lens array 6 can slide while using the grooves 53 as supporting points.

Meanwhile, the second lens array 6 includes the recesses 64 (engaging portions) located substantially at the center in the x direction, which engage with the incident side light shielding plate 7. Accordingly, the incident side light shielding plate 7 can slide while using the recesses 64 as supporting points.

In the meantime, the intermediate light shielding plate 5 includes the projections 56 (the guide portions) which are located at the positions in the x direction, and regulate a displacement in the y direction of the first lens array 4. Moreover, the incident side light shielding plate 7 includes the projections 76 (the guide portions) which are located at the positions in the x direction, and regulate a displacement in the y direction of the second lens array 6. Accordingly, it is possible to correct warpage in the y direction of the first lens array 4 and the second lens array 6.

Meanwhile, the holder 2 includes the hole portions 22 into which the adhesive 11 is injected for fixing the board 8. Here, the hole portions 22 of the holder 2 are formed on the opposite side of the reference surface 3*b* with respect to the board 8 in the direction orthogonal to the reference surface 3*b* (the z direction). Accordingly, the adhesive 11 in the hole portions 22 can be destroyed easily by applying the force to the adhesive 11 while using the jig or the like. As a consequence, the board 8 can be detached from the holder 2 and reused easily.

In the meantime, the adhesive 13 can be easily destroyed by application of the external force when the shear adhesive force of the adhesive 13 is equal to or below 10 MPa under JIS K 6850 glass/glass measurement method.

Meanwhile, the cover 3 fixed to the holder 2 with the adhesive 11 includes the reference surface 3b. Accordingly, it is possible to establish positioning of the first lens array 4, the intermediate light shielding plate 5, the second lens array 6, the incident side light shielding plate 7, and the board 8 in the z direction based on the reference surface 3b of the cover 3. In the meantime, it is not necessary to form a reference surface at high accuracy by machining the holder 2. Hence, it is possible to reduce manufacturing costs of the holder 2 and thus to reduce the manufacturing costs of the exposure device 10.

The absolute value of the difference between the linear expansion coefficient of the board 8 and the linear expansion coefficient of the holder 2 is equal to or below $12 \times 10^{-6}$/K and the absolute value of the difference between the linear expansion coefficient of the cover 3 and the linear expansion coefficient of the holder 2 is equal to or below $12 \times 10^{-6}$/K. Accordingly, it is possible to reduce the differences in amount of expansion or contraction with a change in temperature among the holder 2, the cover 3, and the board 8 which are bonded to one another with the adhesives, and thus to improve the effect to suppress warpage.

Moreover, it is possible to reduce adverse effects of changes in temperature and to secure stable printing quality by using the exposure device 10 in the image formation apparatus 1.

Incidentally, although the above-described exposure device 10 includes the two lens arrays (the first lens array 4 and the second lens array 6), the exposure device 10 may include one lens array or three or more lens arrays. In the meantime, the number and locations of the light shielding plates may be selected as appropriate depending on the number of the lens arrays.

<Image Formation Apparatus>

Next, a description is given of the image formation apparatus 1 (an LED printer) which includes the exposure device 10 serving as a printing head (an LED head).

FIG. 19 is a diagram illustrating the image formation apparatus 1. The image formation apparatus 1 is designed to form an image by means of electrophotography, and is typically a color printer. The image formation apparatus 1 includes process units (image formation units) 30Bk, 30Y, 30M, and 30C housed in a housing 1A, which form black (Bk), yellow (Y), magenta (M), and cyan (C) images, respectively. Meanwhile, an openable and closable cover 1B is provided on the top of the housing 1A.

A sheet feeding mechanism for supplying paper sheets (the recording media) to the process units 30Bk, 30Y, 30M, and 30C is disposed below the image formation apparatus 1. The sheet feeding mechanism includes a paper sheet cassette 101 that stores the paper sheets, a hopping roller 102 that picks up the paper sheets stored in the paper sheet cassette 101 one by one, and paired conveyance rollers 103 that convey the paper sheets picked up with the hopping roller 102 to a conveyor belt 104.

The process units 30Bk, 30Y, 30M, and 30C are arranged from an upstream side to a downstream side (from the right side to the left side in this case) along a conveyance path for the paper sheets. Besides the paper sheets, OHP sheets, envelopes, copying paper, specialty paper, and the like can be used as the recording media.

The process units 30Bk, 30Y, 30M, and 30C includes: cylindrical photoconductor drums 31Bk, 31Y, 31M, and 31C serving as image carriers; charge rollers 32Bk, 32Y, 32M, and 32C serving as charging members to uniformly charge surfaces of the photoconductor drums 31Bk, 31Y, 31M, and 31C; and development rollers 33Bk, 33Y, 33M, and 33C serving as developer carriers (development units), which attach toners (developers) of respective colors onto electrostatic latent images formed on the surfaces of the photoconductor drums 31Bk, 31Y, 31M, and 31C and thus to form toner images (developer images) thereon, respectively.

Moreover, toner supply rollers 34Bk, 34Y, 34M, and 34C serving as supplying members to supply the toners to the development rollers 33Bk, 33Y, 33M, and 33C, and development blades 35Bk, 35Y, 35M, and 35C serving as regulating members to regulate thicknesses of toner layers to be formed on surfaces of the development rollers 33Bk, 33Y, 33M, and 33C are disposed in such a way as to come into contact with the development rollers 33Bk, 33Y, 33M, and 33C. Furthermore, toner cartridges 36Bk, 36Y, 36M, and 36C serving as developer containers to resupply the toners are placed above the toner supply rollers 34Bk, 34Y, 34M, and 34C.

In addition, exposure devices 10Bk, 10Y, 10M, and 10C serving as printing heads are disposed on an upper side of the process units 30Bk, 30Y, 30M, and 30C in such a way as to be opposed to the photoconductor drums 31Bk, 31Y, 31M, and 31C (which are collectively referred to as the photoconductor drums 31 where it is not necessary to distinguish from one another), respectively. Each of the exposure devices 10Bk, 10Y, 10M, and 10C is formed from the exposure device 10 described with reference to FIGS. 1 to 18.

Each exposure device 10 is attached to the image formation apparatus 1 such that the cover 3 (FIG. 2) is opposed to the surface of the corresponding photoconductor drum 31. In this instance, the pressing members (the coil springs) attached to the cover 1B of the image formation apparatus 1 engage with the engaging parts 29 (FIG. 4C) of the exposure device 10, thereby pressing the exposure device 10 downward (that is, toward the photoconductor drum 31). Thus, the contact parts 27 and 28 (FIG. 4A) of the exposure device 10 come into contact with the contact parts in the image formation apparatus 1, whereby the positioning in the z direction of the exposure device 10 is established.

A transfer unit or a transfer device is disposed below the process units 30Bk, 30Y, 30M, and 30C. The transfer unit includes: the conveyor belt 104 serving as a conveying member that travels while attracting the paper sheets thereto; a driving roller 105 that drives the conveyor belt 104; a tension roller 106 that imparts tension to the conveyor belt 104; and transfer rollers 37Bk, 37Y, 37M, and 37C serving as transferring members disposed opposite to the photoconductor drums 31Bk, 31Y, 31M, and 31C while interposing the conveyor belt 104 in between. The transfer rollers 37Bk, 37Y, 37M, and 37C transfer the toner images of the respective colors formed on the photoconductor drums 31Bk, 31Y, 31M, and 31C onto the paper sheets.

A fusing device (a fuser) 107 is disposed on the downstream side (the left side in FIG. 19) of the photoconductor drums 31Bk, 31Y, 31M, and 31C along the direction of conveyance of the paper sheets. The fusing device 107 includes a fusing roller 108 and a pressing roller 109 which apply heat and a pressure to the toner images transferred onto each paper sheet so as to fix the toner images onto the paper sheet; and a temperature sensor 110 that detects a surface temperature of the fusing roller 108.

A discharge mechanism for discharging the paper sheets is disposed further on a downstream side of the fusing device 107. The discharge mechanism includes paired discharge rollers 111 and 112 which convey the paper sheets coming out of the fusing device 107 and discharge the paper sheets from a discharge port. A stacker unit 113 or a stacker 13 to stack the paper sheets discharged by using the paired discharge rollers 111 and 112 are provided on an upper surface of the image formation apparatus 1.

A basic operation of the image formation apparatus 1 is as described below. When an image forming operation is started, the hopping roller 102 is rotated to send the paper sheets stored in the paper sheet cassette 101 one by one to the conveyance path. Moreover, the paired conveyance rollers 103 are rotated at a prescribed timing so as to convey each paper sheet sent out to the conveyance path to the conveyor belt 104. The conveyor belt 104 moves in a direction indicated with an arrow e by the rotation of the driving roller 105, thus conveying the paper sheet while attracting the paper sheet thereto.

Meanwhile, in the process units 30Bk, 30Y, 30M, and 30C, the surfaces of the photoconductor drums 31Bk, 31Y, 31M, and 31C are uniformly charged by using the charge rollers 32Bk, 32Y, 32M, and 32C, respectively.

Moreover, the exposure devices 10Bk, 10Y, 10M, and 10C emit light beams in accordance with image data on the respective colors. As illustrated in FIG. 2, in each exposure head (the exposure device 10), the light beams emitted from the light emitting elements 81 on the board 8 are passed through the openings 71 in the incident side light shielding plate 7, the lens elements 61 of the second lens array 6, the openings 51 in the intermediate light shielding plate 5, the lens elements 41 of the first lens array 4, and the cover 3, and are focused on the surface of the photoconductor drum 31. In this way, the electrostatic latent image is formed on a photosensitive layer on the surface of the photoconductor drum 31.

The electrostatic latent images formed on the respective surfaces of the photoconductor drums 31Bk, 31Y, 31M, and 31C are developed with the toners by the development rollers 33Bk, 33Y, 33M, and 33C and are formed into the toner images. Moreover, along with the movement of the conveyor belt 104, the paper sheet is passed through spaces between the process units 30Bk, 30Y, 30M, and 30C and the transfer rollers 37Bk, 37Y, 37M, and 37C. In this instance, the toner images formed on the respective surfaces of the photoconductor drums 31Bk, 31Y, 31M, and 31C are transferred one by one onto the paper sheet on the conveyor belt 104.

The paper sheet with the transferred toner images is sent to the fusing device 107. In the fusing device 107, the tonner images are heated and pressed by the fusing roller 108 and the pressing roller 109, whereby the toner images are fused and fixed onto the paper sheet. The paper sheet to which the toner images are fixed is discharged to the outside of the image formation apparatus 1 by the paired discharge rollers 111 and 112, and is stacked on the stacker unit 113. Thus, the image forming operation is completed.

<Configuration of Image Reading Apparatus>

Next, a description is given of an image reading apparatus 200 including a reading head 90 provided with a light reception head adopting the optical head.

Figure 20:
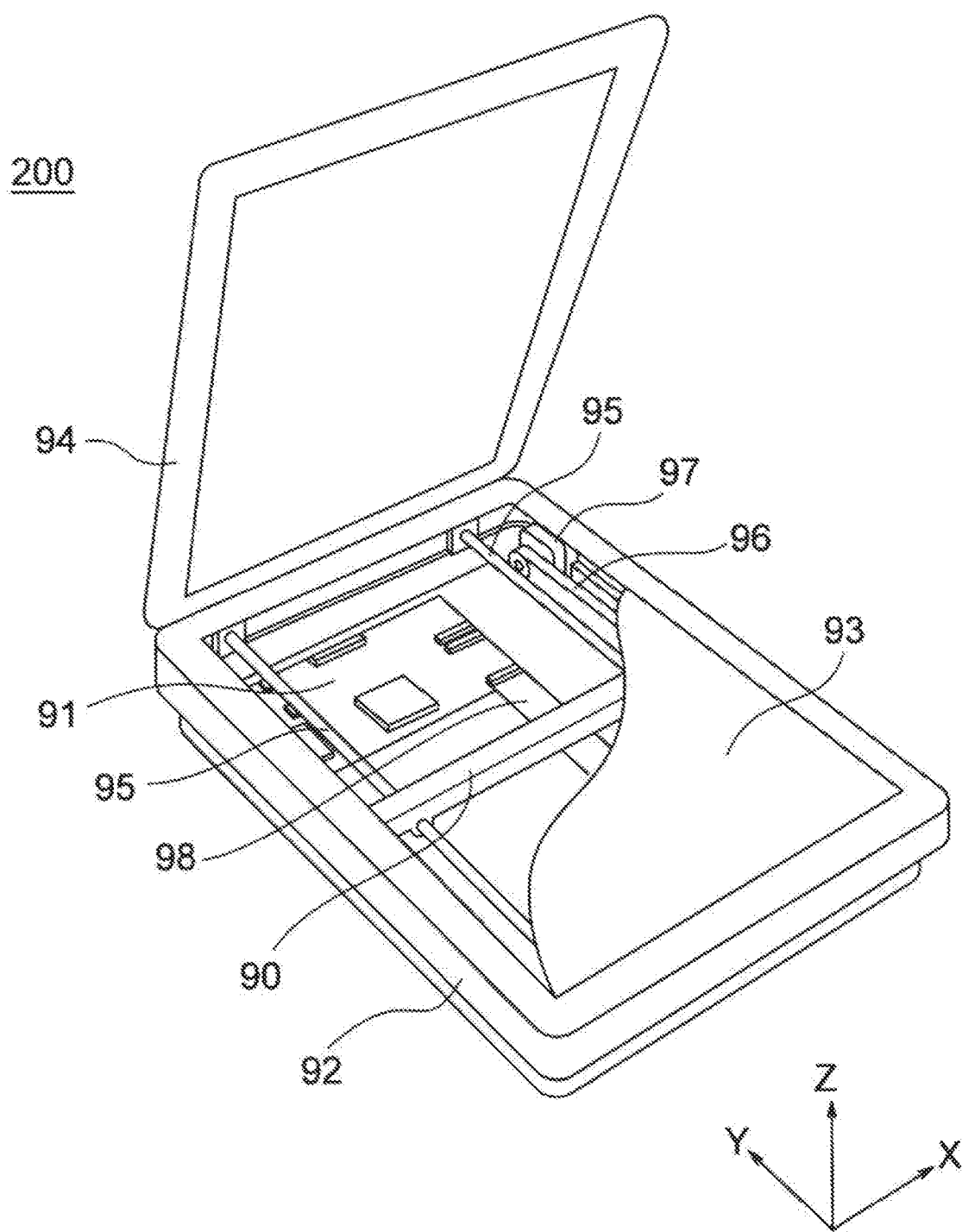
FIG. 20 is a perspective view of an image reading apparatus including a reading head according to one or more embodiments.

FIG. 20 is a perspective view illustrating the image reading apparatus 200. The image reading apparatus 200 is a flat-bed image scanner, for instance. The image reading apparatus 200 includes a housing 92, a platen (a support base) 93 provided on an upper surface of the housing 92, the reading head 90 (a contact image sensor head) serving as the optical head disposed below the platen 93, and a lid 94 that covers an upper side of the platen 93. The platen 93 is made of a material that transmits visible light, such as glass, and a subject copy to be read (a reading object) is placed on a surface of the platen 93.

Figure 21:
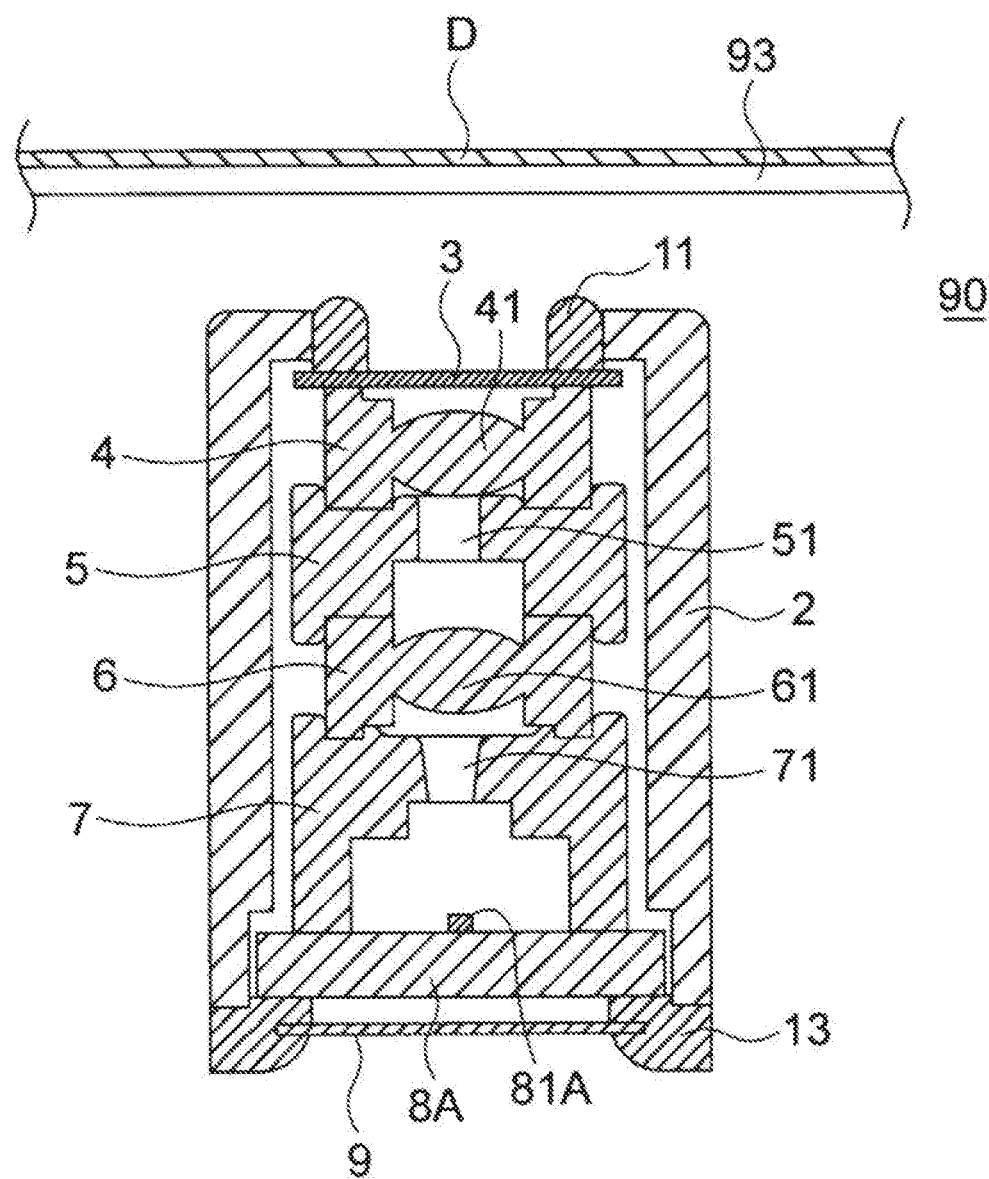
FIG. 21 is a diagram illustrating a view of the reading head.

FIG. 21 is a cross-sectional view illustrating a configuration of the reading head 90. The reading head 90 includes a board 8A (a light receiving element board) provided with light emitting elements 81A instead of the board 8 (a light emitting element board: FIG. 2) provided with the light emitting elements 81. The reading head 90 has a similar configuration to that of the exposure device 10 except that the board 8 is replaced with the board 8A.

Specifically, the reading head 90 includes the holder 2, the cover 3, the first lens array 4, the intermediate light shielding plate 5, the second lens array 6, the incident side light shielding plate 7, the board 8A, and the insulating film 9. The cover 3 is fixed to the holder 2 with the adhesive 11 (FIG. 2), and the board 8A is fixed to the holder 2 with the adhesive 13 (FIG. 2). The first lens array 4, the intermediate light shielding plate 5, the second lens array 6, and the incident side light shielding plate 7 are held between the cover 3 and the board 8A in such a way as to be slidable in the x direction.

The reading head 90 is disposed such that its output side (that is, the cover 3 side) is opposed to the platen 93. Light beams from a subject copy D placed on the platen 93 are passed through the lens element 41 of the first lens array 4, the openings 51 in the intermediate light shielding plate 5, the lens elements 61 of the second lens array 6, and the openings 71 in the incident side light shielding plate 7, and are then focused on the light emitting elements 81A.

A basic operation of the image reading apparatus 200 is as described below. When the subject copy to be read is placed on the platen 93 and a switch such as a scan button is pressed, a light source (not illustrated) attached to the reading head 90 is turned on and illuminates the subject copy to be read. The reading head 90 captures the light beams reflected from the surface of the subject copy to be read while moving in the y direction by using a driving belt 96 which is driven by a stepping motor 97. The reading head 90 converts received optical signals into electric signals.

The reading head 90 has the same features as those of the exposure device 10 described above. Accordingly, the reading head 90 can suppress warpage of the stacked body or breakage of the bonded sections due to a change in temperature. It is possible to secure stable reading quality by using the reading head 90 in the image reading apparatus 200.

Here, instead of moving the reading head 90 as mentioned above, the subject copy to be read may be conveyed with an automatic document feeder (ADF) such that the subject copy is passed through a predetermined reading position on the platen 93, and an image on the subject copy to be read may be read with the reading head 90 which is stationary at the reading position.

Preferred one or more embodiments of this disclosure have been specifically described above. It is to be noted, however, that this disclosure is not limited to the above-described embodiments and various modifications and alterations area possible within the scope not departing from the gist of the invention.

Examples of the image formation apparatus include a printer, a copier, a facsimile machine, a multi-function peripheral, and the like. Examples of the image reading apparatus include a scanner, a multi-function peripheral, and the like.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. An exposure device comprising:
a holding member provided with a reference surface;
an optical system being in contact with the reference surface and slidable in a first direction parallel to the reference surface; and
a board including a light emitting element and being fixed to the holding member such that the optical system is sandwiched between the reference surface and the board, the board being in contact with the optical system.

2. The exposure device according to claim 1, wherein the optical system includes:
a first lens array including lens elements arranged in the first direction and being slidable in the first direction relative to the reference surface;
a first light shielding member including openings arranged in the first direction and being slidable in the first direction relative to the first lens array;
a second lens array including lens elements arranged in the first direction and being slidable in the first direction relative to the first light shielding member; and
a second light shielding member including openings arranged in the first direction and being slidable in the first direction relative to the second lens array, and
the first lens array, the first light shielding member, the second lens array, and the second light shielding member are arranged in sequence from the reference surface side.

3. The exposure device according to claim 2, wherein the holding member includes a regulating portion that is located substantially at the center in the first direction of the first lens array and that regulates a position in the first direction of the first lens array.

4. The exposure device according to claim 2, wherein the first lens array includes an engaging portion that is located substantially at the center in the first direction of the first lens array and that engages with the first light shielding member.

5. The exposure device according to claim 2, wherein the first light shielding member includes an engaging portion that is located substantially at the center in the first direction of the first light shielding member and that engages with the second lens array.

6. The exposure device according to claim 2, wherein the second lens array includes an engaging portion that is located substantially at the center in the first direction of the second lens array and that engages with the second light shielding member.

7. The exposure device according to claim 2, wherein the second light shielding member includes an engaging portion that is located substantially at the center in the first direction of the second light shielding member and that engages with the board.

8. The exposure device according to claim 2, wherein the first light shielding member includes guide portions that are located at positions in the first direction and that regulate a displacement of the first lens array in a second direction orthogonal to the first direction, and
the second light shielding member includes guide portions that are located at positions in the first direction and that regulate a displacement of the second lens array in the second direction orthogonal to the first direction.

9. The exposure device according to claim 1, wherein the board is fixed to the holding member by an adhesive, and
the holding member includes a hole portion through which the adhesive is injected.

10. The exposure device according to claim 9, wherein the hole portion is formed on an opposite side of the reference surface with respect to the board in a direction orthogonal to the reference surface.

11. The exposure device according to claim 9, wherein a shear adhesive force of the adhesive is equal to or below 10 MPa.

12. The exposure device according to claim 1, wherein the holding member includes:
a holder; and
a cover fixed to the holder by an adhesive and provided with the reference surface.

13. The exposure device according to claim 12, wherein an absolute value of a difference between a linear expansion coefficient of the board and a linear expansion coefficient of the holder is equal to or below $12 \times 10^{-6}$/K, and
an absolute value of a difference between a linear expansion coefficient of the cover and the linear expansion coefficient of the holder is equal to or below $12 \times 10^{-6}$/K.

14. An image formation apparatus comprising:
the exposure device according to claim 1;
an image carrier disposed opposite to the exposure device;
a development unit configured to develop an image formed on the image carrier by the exposure device; and
a transfer unit configured to transfer the image developed by the development unit onto a recording medium.

15. The exposure device according to claim 1, wherein the board includes a first surface substantially parallel to the reference surface, and
the first surface is provided with the light emitting element and is contact with the optical system.

16. A reading head comprising:
a holding member provided with a reference surface;
an optical system being in contact with the reference surface and slidable in a first direction parallel to the reference surface; and
a board including a light receiving element and being fixed to the holding member such that the optical system is sandwiched between the reference surface and the board, the board being in contact with the optical system.

17. An image reading apparatus comprising:
the reading head according to claim 16; and
a platen configured to hold a subject copy at a position opposed to the reading head.

18. The reading head according to claim 16, wherein the board includes a first surface substantially parallel to the reference surface, and
the first surface is provided with the light receiving element and is contact with the optical system.

19. An exposure device comprising:
a holding member provided with a reference surface;

an optical system being in contact with the reference surface and slidable in a first direction parallel to the reference surface; and a board including a light emitting element and being fixed to the holding member such that the optical system is sandwiched between the reference surface and the board, wherein the optical system includes:
   a first lens array including lens elements arranged in the first direction and being slidable in the first direction relative to the reference surface;
   a first light shielding member including openings arranged in the first direction and being slidable in the first direction relative to the first lens array;
   a second lens array including lens elements arranged in the first direction and being slidable in the first direction relative to the first light shielding member; and
   a second light shielding member including openings arranged in the first direction and being slidable in the first direction relative to the second lens array, and the first lens array, the first light shielding member, the second lens array, and the second light shielding member are arranged in sequence from the reference surface side, and the second light shielding member includes an engaging portion that is located substantially at the center in the first direction of the second light shielding member and that engages with the board.

* * * * *